United States Patent
Potter et al.

(10) Patent No.: US 12,325,050 B2
(45) Date of Patent: Jun. 10, 2025

(54) SORTING BIOGENIC MATERIALS ACCORDING TO A DESIRED BIOCHAR FORMULATION

(71) Applicant: AMP Robotics Corporation, Louisville, CO (US)

(72) Inventors: Carson C. Potter, Denver, CO (US); Cameron D. Douglas, Boston, MA (US); Jacob Fitzgerald, Wheat Ridge, CO (US); Joseph M. Castagneri, Denver, CO (US); Matanya B. Horowitz, Golden, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 18/903,633

(22) Filed: Oct. 1, 2024

(65) Prior Publication Data
US 2025/0108408 A1    Apr. 3, 2025

Related U.S. Application Data

(60) Provisional application No. 63/542,033, filed on Oct. 2, 2023, provisional application No. 63/542,032, filed on Oct. 2, 2023.

(51) Int. Cl.
| | |
|---|---|
| B07C 5/342 | (2006.01) |
| B02C 23/14 | (2006.01) |
| B03C 1/02 | (2006.01) |
| B07B 1/00 | (2006.01) |
| B07B 13/00 | (2006.01) |
| B07B 15/00 | (2006.01) |
| G01N 31/00 | (2006.01) |

(52) U.S. Cl.
CPC ............. *B07C 5/342* (2013.01); *B02C 23/14* (2013.01); *B03C 1/02* (2013.01); *B07B 1/00* (2013.01); *B07B 13/00* (2013.01); *B07B 15/00* (2013.01); *G01N 31/00* (2013.01)

(58) Field of Classification Search
CPC ......... G01N 31/00; G01N 33/00; B07C 5/342
USPC ........................................................ 209/576
See application file for complete search history.

(56) References Cited

U.S. PATENT DOCUMENTS

| | | | |
|---|---|---|---|
| 4,451,360 A * | 5/1984 | Salmi | B03C 1/02 209/225 |
| 10,898,903 B2 | 1/2021 | Warbis | |
| 11,034,905 B2 | 6/2021 | Heimann | |
| 2009/0032442 A1 | 2/2009 | Singh | |
| 2013/0105199 A1* | 5/2013 | Domesle | F03D 13/20 174/138 R |
| 2015/0191653 A1 | 7/2015 | Traxler | |
| 2022/0331841 A1 | 10/2022 | Filler | |

(Continued)

FOREIGN PATENT DOCUMENTS

| | | | |
|---|---|---|---|
| CN | 201295638 Y | * | 8/2009 |
| CN | 201659025 U | * | 12/2010 |

(Continued)

*Primary Examiner* — Terrell H Matthews
(74) *Attorney, Agent, or Firm* — Van Pelt, Yi & James LLP

(57) ABSTRACT

Sorting biogenic material from a stream of heterogeneous materials is disclosed, including: detecting biogenic material within an input stream of heterogeneous material; sorting the biogenic material based at least in part on a desired biochar formulation; and tracking a composition of a sorted mixture of biogenic material.

20 Claims, 19 Drawing Sheets

(56) References Cited

U.S. PATENT DOCUMENTS

| | | |
|---|---|---|
| 2023/0201841 A1 | 6/2023 | Warbis |
| 2023/0279333 A1 | 9/2023 | Harmon |
| 2024/0024894 A1 * | 1/2024 | Souza ................. B03C 1/032 |
| 2024/0093094 A1 | 3/2024 | Jones |
| 2024/0094185 A1 | 3/2024 | Jones |

FOREIGN PATENT DOCUMENTS

| | | | | |
|---|---|---|---|---|
| CN | 103785528 A | * | 5/2014 | ............... B03C 1/02 |
| EP | 1786080 A1 | * | 5/2007 | ............. F03D 80/85 |
| EP | 2518844 A1 | * | 10/2012 | ............. H02G 1/081 |
| EP | 2604347 A1 | * | 6/2013 | ............. B03C 1/14 |
| GB | 2064377 B | * | 3/1984 | ............. B03C 1/035 |
| WO | 2017136611 | | 8/2017 | |
| WO | 2019008094 | | 1/2019 | |
| WO | 2022193015 | | 9/2022 | |
| WO | 2023137423 | | 7/2023 | |

* cited by examiner

SORTING BIOGENIC MATERIALS ACCORDING TO A DESIRED BIOCHAR FORMULATION

CROSS REFERENCE TO OTHER APPLICATIONS

This application claims priority to U.S. Provisional Patent Application No. 63/542,032 entitled SORTING AND PACKAGING BIOGENIC MATERIALS filed Oct. 2, 2023 which is incorporated herein by reference for all purposes. This application claims priority to U.S. Provisional Patent Application No. 63/542,033 entitled SORTING BIOGENIC MATERIALS FOR BIOCHAR GENERATION filed Oct. 2, 2023 which is incorporated herein by reference for all purposes.

BACKGROUND OF THE INVENTION

Municipal solid waste contains large volumes of material that decomposes into greenhouse gasses (GHG), which contributes to climate change. These materials are largely from "biogenic material" (e.g., organic, compostable) sources, and thus their decomposition is typically a normal part of the carbon cycle. For example, around 70% of municipal solid waste may consist of biogenic material. Examples of biogenic materials include wood, yard waste, food waste, cardboard, and paper. However, biogenic material decomposes into a number of GHG, such as carbon dioxide, and may decompose into methane, a particularly potent GHG. Municipal solid waste-generated GHG represents a large component of overall GHG released into the environment, as a function of landfilling and subsequent anaerobic decomposition as the most common management practice for municipal solid waste. As such, it is desirable to prevent, minimize, and/or delay the decomposition of biogenic materials to reduce the emission of GHG.

BRIEF DESCRIPTION OF THE DRAWINGS

Various embodiments of the invention are disclosed in the following detailed description and the accompanying drawings.

DETAILED DESCRIPTION

Figure 1:
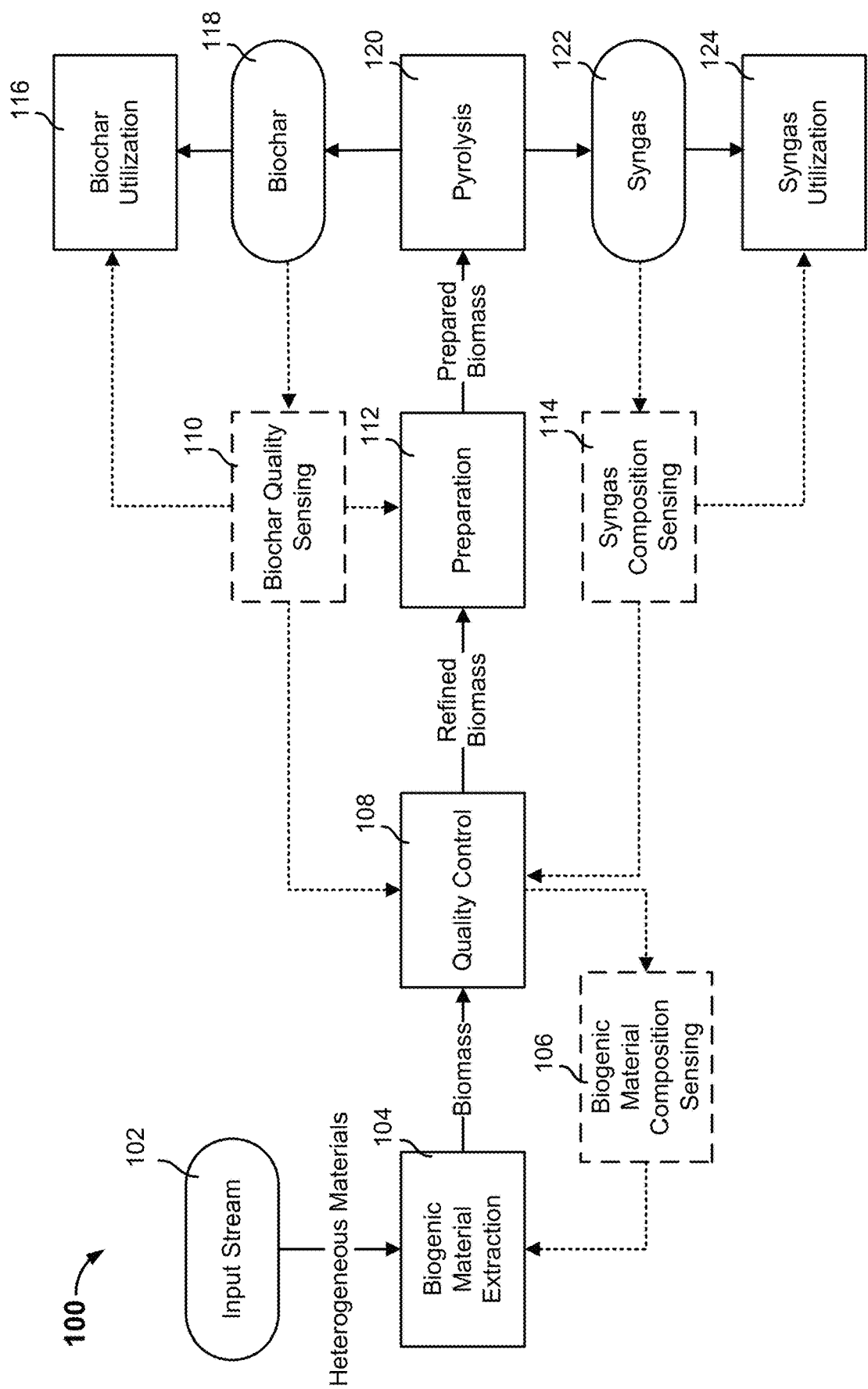
FIG. 1 is a diagram showing an embodiment of processing an input stream of heterogeneous materials to sort out biogenic materials, prepare the biogenic materials, and pyrolyze the biogenic materials.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of sensing biogenic material from a stream of heterogeneous materials are described herein. A set of images of an input stream of heterogeneous materials is received from one or more image sensors. In various embodiments, the input stream of heterogeneous materials comprises municipal solid waste (MSW), which may comprise garbage (e.g., items discarded by the public). For example, MSW may include different waste materials such as biogenic material (e.g., food waste, yard waste), plastic waste (e.g., plastic packaging, plastic film, plastic containers), and paper waste (e.g., paper, cardboard). In various embodiments, "biogenic material" comprises organic matter, compostable matter, or other materials that are derived from living organisms. The input stream of heterogeneous materials (e.g., MSW) is received at a sorting facility, at which materials of different types are sorted/separated into different collection containers (e.g., bunkers). In some embodiments, the input stream is transported across the sorting facility by conveyor devices and the image sensor(s) are placed above the conveyor devices to capture overhead images of the materials below. The set of images captured by the one or more image sensors are analyzed using machine learning to identify a region within the set of images. For example, the region can be detected as including similar or related materials. In some embodiments, the region within the set of images is defined by a set of pixels or a region of pixels within one or more images. The pixel values within the region of the image(s) are analyzed using machine learning to characterize the region into a biogenic-related classification. For example, the biogenic-related classification can indicate whether the items/materials within the region of the image(s) include biogenic materials or not, and if so, which one of a predetermined category of biogenic materials (e.g., food waste, yard waste, wood, paper, cartons, cardboard) is included in the region. A sorting device is instructed to perform a sorting operation on material from the input stream corresponding to the region within the set of images according to the biogenic-related classification. In a first example, a sorting device that is currently located downstream to the material from the input stream corresponding to the region and is configured to sort materials of that biogenic-related classification is instructed to perform a sorting operation to remove the materials from the stream. In a second example, the selected sorting device is instructed to remove the material from the input stream corresponding to the region using a sorting parameter that is determined based at least in part on the determined biogenic-related classification. In a third example, a sorting device is instructed to remove the material from the input stream corresponding to the region and towards a collection container (e.g., a bunker) for which the addition of that material would modify the tracked formulation/composition of the materials within the container to approach or meet a desired formulation/composition. The precise removal of biogenic materials from MSW could greatly reduce the amount of biogenic materials that end up in the landfill and ultimately decompose into undesirable greenhouse gasses (GHG). Furthermore, the biogenic materials that are sorted out of MSW can be further processed into productive substances such as biochar.

Embodiments of sorting biogenic materials for biochar production are described herein. Biogenic materials are detected within an input stream of heterogeneous materials. In various embodiments, the input stream of heterogeneous materials (e.g., MSW) is ingested at a sorting facility that may leverage sensors (e.g., image sensors, hyperspectral sensors, moisture sensors, and/or depth sensors) and also apply machine learning to the sensed data to characterize the objects within the stream, including which objects comprise biogenic material. At least some of the biogenic material from the input stream are sorted (e.g., removed, diverted from the input stream) into a biogenic material related collection container (e.g., a bunker) or into a stream designated for biogenic material. In some embodiments, which detected objects of biogenic material were sorted are determined based on those whose attributes/classifications match a set of target object criteria. In some embodiments, the set of target object criteria are determined based on a desired biochar formulation, which specifies attributes/composition of the sorted mixture of biogenic materials that will be used to produce a selected application/use case/type of biochar. A composition of the mixture of biogenic materials that have been sorted (e.g., harvested) so far is tracked. For example, which objects that were identified for sortation and then successfully sorted can be tracked. Moreover, the detected attributes of the (successfully) sorted objects can also be used to look up additional characteristics (e.g., chemical composition) of the sorted/detected objects. The detected and looked up attributes/characteristics of the collection of already sorted objects can be tracked in real-time and therefore, the composition of the collection of sorted biogenic materials can be determined. In some embodiments, the tracked composition can be compared to the desired formulation to determine whether a discrepancy exists. In the event that a discrepancy exists, the discrepancy can serve as feedback to update sorting parameters (e.g., the set of target object criteria). Updating the sorting parameters will affect the subsequent selecting and/or sorting of biogenic materials to add to the mixture of biogenic materials so that the updated composition of the sorted biogenic materials will more closely match the desired formulation.

As will be described in further detail below, biogenic material may be separated from an input stream of heterogeneous materials using separation equipment, sensors, sorting devices, and with or without the use of machine learning/artificial intelligence. The separated out biogenic material can be processed to create new materials and/or to sequester carbon. Processing or sequestering biogenic materials prevents emission of the resulting GHGs back into the atmosphere, while introducing low-carbon manufacturing feedstock back into the supply chain. As such, techniques for separating GHG producing materials from heterogeneous MSW and sequestering these materials in a manner that removes the carbon content from the carbon cycle are disclosed here. Furthermore, techniques for formulating the feedstock (e.g., the mixture of sorted biogenic material), controlling the process-sometimes dynamically, and otherwise regulating the outcome to control for optimal production of carbon sequestration, capturing commodities such as recyclable materials, and high-quality synthetic gas (which is sometimes referred as "syngas") are disclosed herein.

FIG. 1 is a diagram showing an embodiment of processing an input stream of heterogeneous materials to sort out biogenic materials, prepare the biogenic materials, and pyrolyze the biogenic materials. In some embodiments, input stream 102 of heterogeneous materials comprises MSW. As shown in FIG. 1, in process 100, input stream 102 is ingested at a sorting facility and subjected to biogenic material extraction 104. As will be described in further detail below, a management control system (MCS) comprises a control system application that programmatically monitors and tracks the performance of sorting facility components (e.g., sensors, sorting devices, conveyor devices, preprocessing machines) and dynamically reconfigures the sorting facility devices in response to monitored events. In various embodiments, biogenic material extraction 104 comprises using sensor data captured (e.g., using one or more types of sensors) with respect to input stream 102 (e.g., at one or more points within the sorting facility through which input stream 102 is being transported), applying machine learning/artificial intelligence to the sensed data to characterize the materials within input stream 102, and using the characterization to instruct one or more sorting devices within the sorting facility to sort/remove the material that has been identified as (likely) biogenic material and/or to remove the material that has not been identified as (likely) biogenic material such that the biogenic portion of input stream 102 can be harvested. The harvested/collected biogenic material can be considered as a form of "feedstock." In various embodiments, the identified/harvested biogenic material is also sometimes referred to as "biomass." In conjunction with biogenic material extraction 104, quality control 108 is performed on such extracted biogenic material/biomass at the sorting facility through biogenic material composition sensing 106. For example, quality control 108 uses sensing to detect whether the sorted biogenic material on a pathway through the sorting facility that has been designated for biomass includes any non-biogenic material and, optionally, includes one or more sorting devices that are configured to remove sensed non-biogenic and/or contaminant material from that biomass-related pathway. For example, biogenic material composition sensing 106 comprises estimated measurements of the chemical composition (e.g., the amount or percentage of carbon or other elements, either desirable or undesirable) within the harvested biogenic materials. Biogenic material composition sensing 106 can then be provided as (e.g., real-time) feedback to the MCS, which in response, may dynamically reconfigure the sorting and/or targeting parameters of biogenic material extraction 104 to result in the accumulation of harvested biogenic materials meeting a desired formulation. Examples of desired formulation/composition of materials within the sorted biogenic materials include a specific moisture content, a balance of chemical composition within the byproduct (e.g., Hydrogen/Carbon ratio), an organic lignocellulosic content, and/or control the concentration of hazardous or foreign materials. For example, the desired formulation may be determined by a designated downstream processing of the biogenic materials such as the process parameters of preparation 112, pyrolysis 120, and/or the desired use cases of the byproducts of pyrolysis 120.

While not shown in FIG. 1, processes similar to 104, 106, and 108 as described above can be performed at the same sorting facility to also extract non-biogenic materials at a high purity from input stream 102. Examples of non-biogenic materials that can be extracted from input stream 102 include recyclable materials (e.g., metals, glass, plastics, etc.) or other commodities that are then subject to downstream processing that are not described in FIG. 1.

As a result of quality control 108, the biomass that is extracted by biogenic material extraction 104 from input stream 102 can be thought of as "refined biomass," which is biomass that has higher purity. The refined biomass is transported (e.g., conveyed or trucked) to preparation 112. In some embodiments, preparation 112 comprises treating the refined biomass to adjust moisture content and/or carbon content. For example, preparation 112 may include drying the refined biomass and/or adding additional material to the refined biomass so that the resulting biomass mixture meets a desired formulation. In some embodiments, the drying process may persist until the moisture level within the dried biomass is reduced to at least a threshold moisture level (e.g., 15-20%). Once prepared, the prepared biomass is transported (e.g., conveyed or trucked) to pyrolysis 120 (or other forms of temperature and pressure-based treatments). Pyrolysis 120 subjects the prepared biomass to temperature and/or pressure-based conditioning to produce biochar 118, which is a carbon-stable charcoal-like solid material, and also synthetic gas ("syngas") 122 (e.g., methane). Biochar is a charcoal that advantageously sequesters carbon and therefore prevents carbon from re-entering the atmosphere. Syngas 122 may be stored for later use or utilized (syngas utilization 124) to fuel further processes onsite at the sorting facility or elsewhere. For example, syngas 122 can provide onsite heat and power at the facility, serve as a biofuel intermediate, and sustainable residue fuel. Biochar 118 may then be removed from the pyrolysis system and stored for use within the facility (e.g., to admix with concrete) or transported to other facilities for carbon sequestration uses (biochar utilization 116), such as, for example, soil amendments and landfill cover, fuel for thermal processes, and filtration systems. The quality of both biochar 118 and syngas 122 may be measured using various sensing modalities at biochar quality sensing 110 and syngas composition sensing 114, respectively.

As mentioned above, the produced biochar can be used in several different possible applications. Examples of such applications include soil remediation, concrete intermixing (where the carbon is locked into concrete), and/or used as Alternative Daily Cover (this is fine, inert grit/powder that is used as a packing layer for structural support, cooling, and ensuring material deposition within a landfill or for road preparation). Which application/use case the biochar may be appropriate for can be determined by the chemical composition characterization of the biogenic material before it was converted into the biochar or the characterization of the biochar itself. For example, samples of produced biochar 118 and syngas 122 can be evaluated to determine measurements such as chemical composition and/or purity against desired formulations. If the chemical composition/purity of either biochar 118 and syngas 122 do not meet a respective desired formulation, then the measurements can be provided as (e.g., real-time) feedback to the MCS, which in response, may dynamically reconfigure a process that is upstream from pyrolysis 120 (e.g., biogenic material extraction 104, quality control 108, and/or preparation 112). For example, if a lack of purity (e.g., the detected purity is less than a desired purity rate) in biochar 118 may be sensed, then the MCS may reconfigure parameters of the sorting devices at biogenic material extraction 104 and/or quality control 108 in order to better tune the subsequent output of the feedstock extraction process. Feedback related to the quality and/or composition of either biochar 118 and/or syngas 122 to the MCS may also prompt the MCS to dynamically reconfigure process parameters of preparation 112 and/or pyrolysis 120 to better tune the subsequent output of the preparation and/or pyrolysis processes. For example, process parameters related to preparation 112 and/or pyrolysis 120 may involve the temperature of the drying/pyrolysis and the residence time (e.g., the length of time that material is dried or pyrolyzed).

As shown in FIG. 1, input stream 102 (e.g., MSW) can be efficiently processed to extract biogenic materials, which are then prepared for and subjected to pyrolysis to produce carbon-sequestering biochar, and all in a manner that is aware of the current composition of the sorted biogenic materials and the byproducts of the pyrolysis such that the extraction/sorting, preparing, and/or pyrolysis of the biogenic materials can be dynamically reconfigured to achieve desired formulations of the sorted biogenic materials and/or the resulting pyrolysis byproducts. As such, not only can heterogeneous waste such as MSW be efficiently sorted for materials that may avoid the landfill, which is a source of GHG, but such waste can also be productively processed for carbon-drawing utilization.

In some embodiments and as will be described in further detail below, process 100 may be implemented at one or more sorting facilities. In a first example, process 100 can be performed at a single sorting facility. In another example, process 100 can be split up across multiple sorting facilities, in which some sorting facilities may independently perform some of the same steps of process 100 on different instances of material input streams and then the processing results (e.g., refined biomass) from those sorting facilities can be transported to other sorting facilities to complete preparation 112 and/or pyrolysis 120. In one specific example, one facility can perform preparation 112 and/or pyrolysis 120 in a centralized manner on biomass sorted by and aggregated from other sorting facilities.

While not shown in FIG. 1, an alternative to pyrolysis 120 and its associated byproducts is to package the prepared biomass and then sequester the packaged biomass (e.g., through burial of the packaged biomass, which prevents GHG from escaping from the package/burial).

Figure 2:
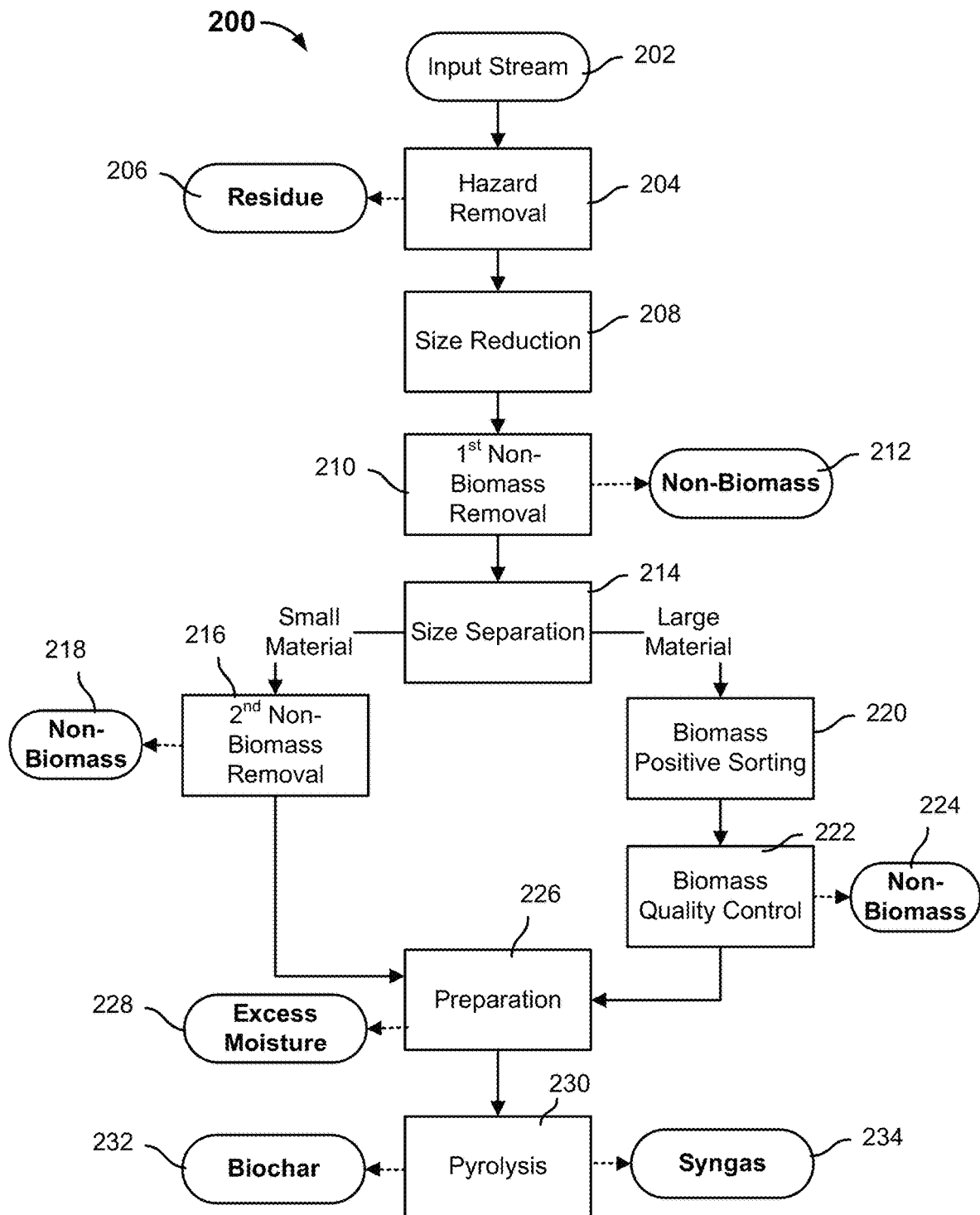
FIG. 2 is a diagram showing an example of processing an input stream of heterogeneous materials to sort out biogenic materials, prepare the biogenic materials, and pyrolyze the biogenic materials.

FIG. 2 is a diagram showing an example of processing an input stream of heterogeneous materials to sort out biogenic materials, prepare the biogenic materials, and pyrolyze the biogenic materials. In some embodiments, process 100 of FIG. 1 may be implemented using process 200 of FIG. 2. In some embodiments, input stream 202 of heterogeneous materials comprises MSW. As shown in FIG. 2, in process 200, input stream 202 is ingested at a sorting facility and subjected to hazard removal 204. For example, hazardous items may include explosive or flammable items (e.g., propane tanks, batteries). At hazard removal 204, hazardous material is removed from input stream 202. Hazard removal 204 may be accomplished in one or more ways, including manual sortation, automated detection with "near infrared" sensors (NIR) or X-ray sensors to search for "hot spots" in input stream 202, fire dousing, and removal of hazardous items with grappling or robotic sorting devices. The resulting residue 206 feed (comprising hazardous items) may be discarded or shunted to other sorting lines. The remaining items of input stream 202 after hazard removal 204 proceed (e.g., via conveyance) to size reduction 208. For example, larger materials not suitable for inclusion in biochar may then be identified and removed from the stream. In a specific example, materials greater than 12-18" in diameter, or may be smaller or larger depending upon the overall sorting system objectives, are reduced in size to approximately the 12-18" range. In some embodiments, such larger materials are separated from the input stream 202 using a shredder and then reduced in size using a shredder, a bag breaker, and/or a reducer. Manual processes may be utilized for this procedure, or it may be automated by first using standardized equipment such as reducers, shredders, and bag breakers to reduce material size, with larger objects then sorted out. The non-sorted material then continues to be conveyed through the system to the next stage. After size reduction 208, the materials of input stream 202 proceed to first non-biomass removal 210. In the example of process 200, more than one instance of removing non-biomass (non-biogenic materials) from input stream 202 occurs and first non-biomass removal 210 occurs before the materials of the stream are separated by size. In some embodiments, first non-biomass removal 210 comprises ferrous extraction and also manual extraction. For example, ferrous extraction is the removal of small metallic objects using magnets (e.g., electromagnets, permanent magnets, drum magnets, belted magnets). In addition, at this stage, in some embodiments, optical techniques (e.g., cameras/images/vision sensors) are used to capture images of input stream 202 and such images are analyzed using machine learning to identify the presence and location of metallic objects. Then, one or more sorting devices (e.g., with diverting mechanisms such as robotic grippers, air jets, etc.) can be instructed (e.g., under coordination of the MCS) to remove the identified metallic objects from the stream. The removed non-biomass 212 can be sent to residue 206 or another non-biomass 212 pathway. Next, the remaining material of input stream 202 is subjected to size separation 214, which separates input stream 202 into at least two sub-streams, including: small fractions/materials and large fractions/materials. During size separation 214, many different types of size-based separation devices may be used to divert small particles (e.g., that have diameters between 0.25 to 2") from the flow of material stream 202, including one or more of the following: screens, (e.g., disc screens, ballistic separators, finger screens, flip-flop screens, vibratory screens, paddle separators, auger screens, trommel screens, debris roll screens, star screens), reducers, shredders, pulverizers, grinders, and mills. The sub-stream of smaller material may include biogenic material (e.g., chunks of food waste and paper pieces) and non-biogenic material. The smaller material that is yielded by the size separation process would proceed (e.g., be conveyed) to second non-biomass removal 216 and larger material that is yielded by the size separation process would proceed (e.g., be conveyed) to biomass positive sorting 220. In some embodiments, while not shown in FIG. 2, size separation 214 may include more than one stage of size separation and could not only separate out materials that are within 0.25-2" in diameter but also separate materials into sub-streams of 0.25-1" and 1-2" diameter objects that will be processed similarly in parallel. In various embodiments, a "positive sort" refers to removing desirable ("target") material from a stream of materials and conversely, a "negative sort" refers to removing undesirable ("non-target") material from the stream. As will be described below, the sub-stream of small materials (e.g., materials 0.25-2" in diameter) separated by size separation 214 is placed on a negative sort pathway (where non-biogenic material will be removed to leave biogenic material remaining in the stream) and the sub-stream of large materials (e.g., materials greater than 2" in diameter) separated by size separation 214 is placed on a positive sort pathway (where biogenic material will be sorted/removed from the stream). For example, large materials (e.g., materials greater than 2" in diameter) may include food and yard waste.

The sub-stream of small materials (e.g., materials 0.25-2" in diameter) separated by size separation 214 is placed on a pathway through the sorting facility that leads to second non-biomass removal 216. For example, at second non-biomass removal 216, the smaller material from input stream 202 is subjected to extraction/removal of one or more types of non-biogenic materials such as, for example, small metallic objects, dense (non-biomass) objects, and plastics. For example, at second non-biomass removal 216, various types of magnets and air-based separators can be used to mechanically remove non-biogenic materials. Also, furthermore, sensors (e.g., optical and/or NIR) can be used to capture sensed data on the material and then machine learning can be used to characterize the material within the sensed data and the MCS can instruct one or more sorting devices to sort/remove the non-biogenic material out of the small material sub-stream and into one or more non-biomass 218 pathways and/or bunkers. In some embodiments, sensed data/signals from optical sensors are used to detect the presence of non-biogenic material within the sub-stream without the use of machine learning/artificial intelligence and instead by comparing the reflected light from the material against classified ranges of wavelengths to identify the relevant material (e.g., different wavelengths can be mapped to different material types, including biogenic and non-biogenic material types). In some embodiments, sensed data from non-image-based sensors (e.g., moisture, NIR) are used to detect the presence of non-biogenic material within the sub-stream without the use of machine learning/artificial intelligence. In a first example, a spectral signature of the material can be measured by an NIR sensor and that signature can be compared against known signatures associated with non-biogenic material (e.g., plastics). In a second example, a sensed moisture level of the material can be measured by a moisture sensor and that moisture level can be compared against known moisture levels associated with non-biogenic material (e.g., plastics). In some embodiments, sensed data from non-image-based sensors can be used without machine learning-based analysis to detect the presence of non-biogenic material. In response to the detection of non-biogenic material (with or without machine learning/artificial intelligence), a sorting device can be instructed to sort the detected non-biogenic material. Examples of sorting devices include robotic grippers and/or controllable arrays of air jets, which will be described in further detail below. The instructed sorting device will perform a sorting action on the non-biogenic material and therefore remove it from the sub-stream. Due to only targeting non-biogenic material at second non-biomass removal 216, the remaining (e.g., on conveyor devices) material within the sub-stream of small materials after second non-biomass removal 216 is assumed to be biogenic materials.

The sub-stream of large materials (e.g., materials greater than 2" in diameter) separated by size separation 214 is placed on a pathway through the sorting facility that leads to biomass positive sorting 220. At biomass positive sorting 220, a positive sort may be employed to identify and sort desirable large organic materials to meet a desired formulation (e.g., suitable for target biochar and/or syngas creation). As described with biogenic material extraction 104 of FIG. 1 and as will be described in further detail below, in some embodiments, at biomass positive sorting 220, sensor data captured (e.g., using one or more types of sensors) is captured with respect to the sub-stream of large materials, applying machine learning/artificial intelligence to the sensed data to characterize the materials within the sub-stream of large materials, and using the characterization to instruct one or more sorting devices along the large materials pathway(s) (within the sorting facility) to sort/remove the material that has been identified as (likely) biogenic material from the sub-stream and into corresponding bunkers or pathway(s) designated for biomass. Examples of sensors that can be used during biomass positive sorting 220 include image sensors, NIR sensors, acoustic sensors, moisture sensors, depth sensors (based on time of flight or stereoscopic imagery), hyperspectral sensors (e.g., from the ultraviolet to the infrared ranges), inductive sensors, magnetic sensors, and capacitive sensors. Examples of sorting devices include robotic grippers and/or controllable arrays of air jets, which will be described in further detail below. Biomass positive sorting 220 may also use old corrugated cardboard screen(s) and/or manual separation. The sensed data may be used with or without machine learning to analyze/detect the material type/classification of the objects to enable the sortation of target objects (e.g., the harvesting of target objects from the sub-stream). The extracted/sorted biomass is then subject to biomass quality control 222. As described with quality control 106 of FIG. 1, this quality control stage (222) may be used to validate and further sort the organic compounds for purity (e.g., by removing the non-biomass). This quality control stage may use secondary manual sorters, or sensors and AI-based sorting to ensure only quality organic material proceeds. Non-biomass 224 that is removed from the biomass pathway(s)/bunkers may be sorted by material type and conveyed onto respective pathways for their designated categories (e.g., recyclable materials) within the sorting facility.

The small biomass material that remains (e.g., on the conveyance system) after second non-biomass removal 216 and the large biomass material that was positively sorted by biomass positive sorting 220 and refined via biomass quality control 222 are both transported (e.g., via conveyance or trucking) to preparation 226. As described with preparation 112 of FIG. 1, preparation 226 preprocesses the combined small and large biomass materials. In some embodiments, preparation 226 adds additional material into the biomass mixture or even replacing at least a portion of the biomass mixture with additional material to change the overall composition (e.g., to meet a desired formulation). For example, additive materials can be added to the refined/sorted biogenic material (or at least a portion of the refined/sorted biogenic material can be replaced with additive materials) so that the resulting mix of biogenic and additive material meets a desired recipe/chemical composition/benefit for the subsequent drying process, the subsequent pyrolysis process, and/or a selected formulation associated with the biochar or syngas that is to be processed on the sorted biomass. Examples of these additive materials include paper, cardboard, other fiber materials, textiles, plastics, inert material, and many others. In particular, lignocellulosic materials (e.g., paper, cardboard) are often deemed unrecyclable due to contamination. Using the unrecyclable contaminated lignocellulosic materials to change the chemical composition of biogenic material would prevent such material from otherwise being discarded as residue. These added materials may be beneficial due to their energy content, dryness, mass, chemical composition, or other properties. These materials may be separated through choice and design of the separation equipment of the sorting facility. This material may also be separated through other mechanisms and be selectively re-introduced to the organics stream similar to an additive. In some embodiments, preparation 226 dries the biogenic material (to remove excess moisture 228) and also reduces the fine material within. Either drying or fine material reduction may be performed first, depending on the desired formulation of the resulting biochar. For example, drying is performed on the biogenic material using any form of moisture removing system, including drum dryer, thermal belt dryer, passive drying (e.g., a drying area), drying via pressing, or adding dry material to the biogenic material to reduce the moisture level of the combined mixture. The drying process may be monitored manually or automatically with machine vision or moisture sensors or a combination, prior to moving the material to the next stage.

In some embodiments, the drying process may persist until the moisture level within the dried biomass is reduced to at least a threshold moisture level (e.g., 15-20%). Depending on the material, fines (e.g., small non-biogenic pieces that are less than 0.5" in diameter) may still be in place (e.g., glass, metal, plastic, or concrete particles) that are undesirable for the biochar mix. In some cases, these fines are easier to remove after drying or vice versa, thus the drying and fines reduction processes are swappable in order. Fines are typically targeted for removal using a disc screen, ballistic separator, a finger screen, a flip-flow screen, a vibratory screen, a paddler separator, an auger screen, a trommel screen, a debris roll screen, and/or a star screen. In some embodiments, density separation may be performed after drying to remove (remaining) inert materials. In some embodiments, sensed data with respect to the biogenic materials stream is captured and then analyzed for the presence of undesirable fines, which are then removed via the sorting device from the biogenic materials prior to pyrolysis 230.

Once the biogenic material has completed preparation 226 (e.g., the fined biomass has been dried and fines thereof are removed), the prepared material is processed for pyrolysis 230 either onsite at the same facility at which preparation 226 took place, or the prepared material is shipped to a separate facility to perform pyrolysis. In some embodiments, pyrolysis 230 comprises systems that utilize a rotary kiln, screw auger, non-continuous vat or tank, or a thermal decomposition unit to reduce the prepared biogenic material to its constituent solid carbon form (biochar 232) and/or syngas 234. In some embodiments, jam-tolerant equipment may be utilized in this stage (e.g., double door air locks) as well as large diameter kilns to handle the bulk material. Pyrolysis 230 may be driven by any form of energy generation, including, for example, one or more of the following: natural gas heating, syngas heating, microwave energy, and electrical heating. Pyrolysis 230 may be accomplished via continuous processes (e.g., belt fed directly into the heating system, rotary kiln, or auger screw) or batch processes (e.g., distribution into heating vat, muffle kiln Top Lit Up Draft Oven, Top Fed Open Draft Oven) or a combination thereof. Syngas 234 that is generated by pyrolysis 230 may be used to heat and/or power other processes in the process such as the upstream drying process in preparation 226.

In some embodiments, process 200 may be implemented at one or more sorting facilities (e.g., different stages of the process flow are performed at different facilities). For example, in a hub and spoke model in which a hub/centralized sorting facility receives sorted/processed material from one or more spoke sorting facilities (e.g., that are located near landfills, where MSW is typically processed), the initial stages (e.g., hazard removal 204, size reduction 208, first non-biomass removal 210) may be performed at a general waste management facility (e.g., a spoke sorting facility), and then the remaining biochar candidate material may be shipped to a dedicated preparation/biochar facility (e.g., a hub sorting facility).

Figure 3:
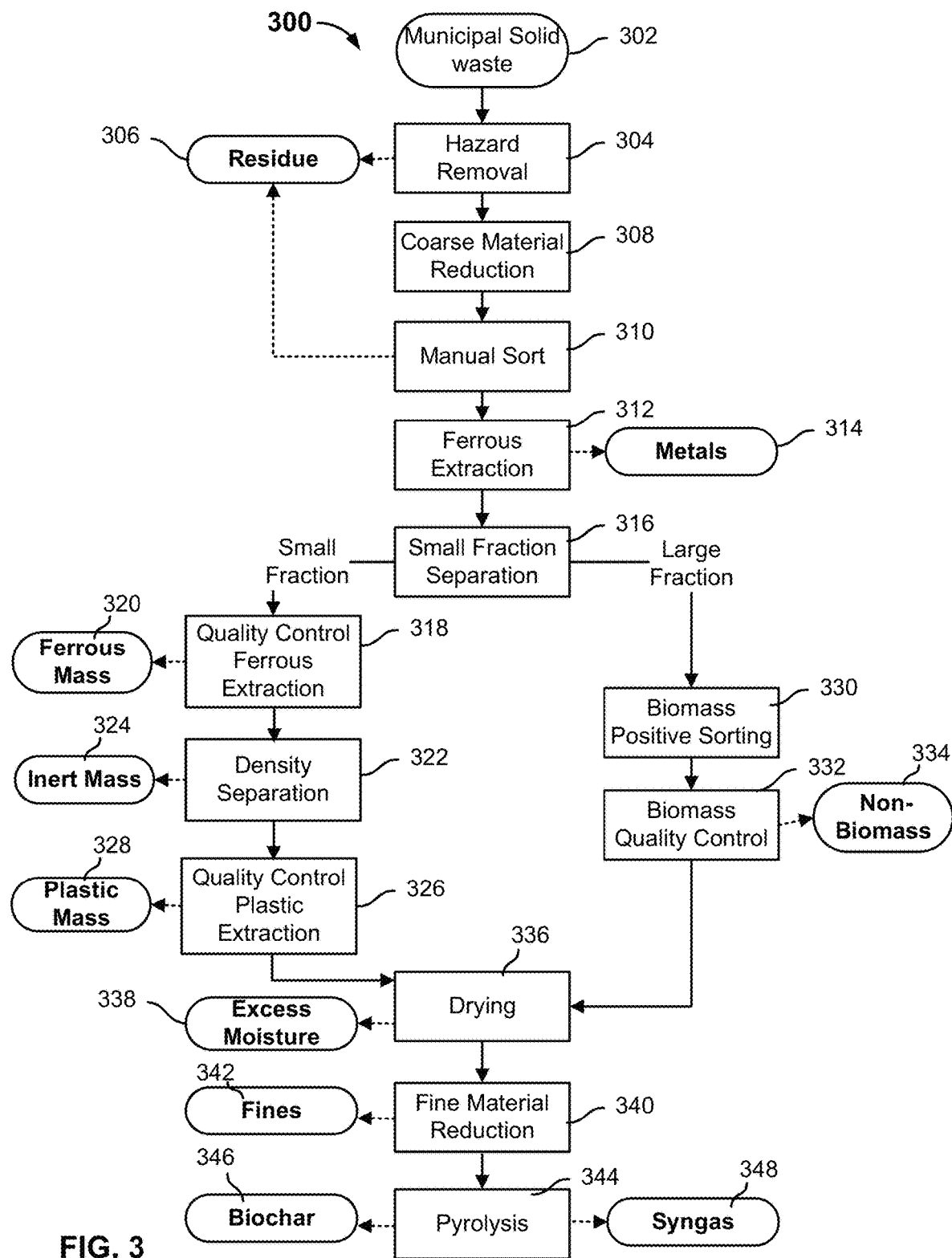
FIG. 3 is a diagram showing an example of processing an input stream of MSW to sort out biogenic materials, prepare the biogenic materials, and pyrolyze the biogenic materials.

FIG. 3 is a diagram showing an example of processing an input stream of MSW to sort out biogenic materials, prepare the biogenic materials, and pyrolyze the biogenic materials. In some embodiments, process 100 of FIG. 1 may be implemented using process 300 of FIG. 3. In some embodiments, process 200 of FIG. 2 may be implemented using process 300 of FIG. 3. In some embodiments, the input stream of heterogeneous materials to be handled by process 300 comprises MSW 302. As shown in FIG. 3, in process 300, MSW 302 is ingested at a sorting facility and subjected to hazard removal 304. Hazard removal 304 can be performed similarly to hazard removal 204 of FIG. 2 to remove hazardous residue 306 from MSW 302. After hazard removal 304, the remaining MSW 302 proceeds (e.g., via conveyance) to coarse material reduction 308. In some embodiments, coarse material reduction 308 includes reducing large material down to a size of between 12-18" in diameter using reducers, shredders, and bag breakers (e.g., to open bags of materials), similar to what was described for size reduction 208 of FIG. 2. After coarse material reduction 308, the reduced MSW 302 proceeds (e.g., via conveyance) to manual sort 310. In some embodiments, manual sort 310 comprises one or more operators manually removing material out of the stream of MSW 302 according to some removal criteria (e.g., as the material stream is conveyed past the individuals) (e.g., including hazardous material that failed to be removed at hazard removal 304). After manual sort 310, the remaining MSW 302 stream proceeds (e.g., via conveyance) to ferrous extraction 312. Ferrous extraction 312 can be performed to remove small metallic objects (metals 314) from MSW 302. For example, the metallic objects can be removed using magnets such as one or more of the following: electromagnets, permanent magnets, drum magnets, and belted magnets. Additionally, in some embodiments, images of MSW 302 can be analyzed using machine learning to identify metal objects within the stream and then sorting devices can be instructed to remove such objects from the stream of MSW 302. Subsequent to ferrous extraction 312, the remaining stream of MSW 302 is subjected to small fraction separation 316, in which small fractions/materials from MSW 302 are separated from the remaining large fractions/materials. For example, material that is 0.25-2" in diameter is considered small fractions and material that is larger than 2" in diameter is considered large fractions. Small fraction separation 316 can be performed similarly to size separation 214 of FIG. 2 to split the stream of MSW 302 into a small fractions sub-stream and a large fractions sub-stream. After small fraction separation 316, small fractions and large fractions proceed (e.g., via conveyance) along different pathways in the sorting facility to quality control ferrous extraction 318 and biomass positive sorting 330, respectively. As will be described below, the stream of small materials (e.g., materials between 0.25-2" in diameter) separated by small fraction separation 316 is placed on a negative sort pathway (where non-biogenic material will be removed) and the stream of large materials (e.g., materials greater than 2" in diameter) separated by small fraction separation 316 is placed on a positive sort pathway (where biogenic material will be removed/harvested).

Biomass positive sorting 330 can be performed similarly to biomass positive sorting 220 of FIG. 2 to remove large fraction biogenic material. Biomass quality control 332 can be performed similarly to biomass positive sorting 222 of FIG. 2 to improve the purity of large fraction biogenic material by removing non-biomass 334.

The small fraction materials separated from MSW 302 by small fraction separation 316 are subjected to several sorting stages prior to being prepared for pyrolysis, to remove materials (e.g., contaminants) that are undesirable for biochar, and the undesirable, removed non-biomass can be sent to residue or secondary sorting systems. In the example of process 300, such sorting stages include quality control ferrous extraction 318, density separation 322, and quality control plastic extraction 326, which may be performed in varying order. In quality control ferrous extraction 318, a secondary magnetic system (using similar magnet systems to what was described above with ferrous extraction 312) or a combination of sensors, machine learning processing, and sorting device(s) may be utilized to remove metallic objects (ferrous mass 320) that are remaining in the material at this stage of process 300. At density separation 322, a density separator system may then be used to separate out excessively light fractions (e.g., film) as well as excessively heavy fractions (e.g., glass) as inert mass 324. Examples of density separator systems include: Wind Shifter®, Air Knife®, cyclonic separator, vacuum-based systems, air magnet, or other forms of air conveyance. Inert materials comprise materials that are non-reactive and non-biodegradable. Inert mass 324 comprises fractions that are 0.5" and under in diameter. Density separation may occur upstream and/or downstream of drying (e.g., drying 336) and other mentioned process stages, in order to maximize the effective density differential between target materials and contaminants. In some embodiments, this effective density pressure may be optimized (e.g., subject to dynamic reconfiguration) by the MCS based on historical performance. At quality control plastic extraction 326, in some embodiments, plastics that remain in the stream of small fractions (e.g., plastics may have been removed from MSW 302 prior to its ingestion in process 300) may be sensed using sensors (e.g., cameras or NIR) and the sensed data can be analyzed using machine learning to identify plastic objects within the stream and then sorting devices (e.g., controllable array sorting devices or gripper-based sorting devices) can be instructed to remove such objects (plastic mass 328) from the stream of small fractions. At quality control plastic extraction 326, in some embodiments, plastics that remain in the stream of small fractions may also be detected using optical sensors (without machine learning) and sorted using sorting devices. In some embodiments, plastic removal at quality control plastic extraction 326 can be performed using manual separation.

In some embodiments, the MCS could be leveraged to control the sizing of the screening and/or the density separation dynamically. For example, if apertures were composed of two adjacent screens, then the positions of the two adjacent screens could be adjusted to control for the degree of spacing exposed between the two screens before being shuffled/shaken/vibrated to trigger the screening motion. In another example, the axel spacing or rotation speed of a rotating axel screen could be dynamically controlled to alter the screen spacing by changing the interface between the different "gears" of the screen. Density separation, which is typically air-based techniques, relies on a certain air flow pressure and pattern, which can be modulated by either adjusting blower power or by dynamically controlling a panel that can slide over the entrance to the wind tunnel (known as a "blast gate"), which in effect adjusts the apparent aperture through which the air can pass into the separation chamber, altering the air pressure. These actuation techniques can be adapted and controlled by the MCS in response to closed loop feedback. A "closed loop feedback" comprises a system that sees what is coming in, then sees what is coming out of each separate outflow, and can use that information to optimize for the settings of the device. This could be very useful given the variable density of organics, which is driven largely by the wide variation of moisture.

In some embodiments, sensed data from optical sensors are used to detect the presence of non-biogenic material within the stream without the use of machine learning/artificial intelligence and instead by comparing the reflected light from the material against classified ranges of wavelengths to identify the relevant material (e.g., different wavelengths can be mapped to different material types, including biogenic and non-biogenic material types). In some embodiments, sensed data from non-image-based sensors (e.g., moisture, NIR) is used to detect the presence of non-biogenic material at one or more of quality control ferrous extraction 318, density separation 322, and quality control plastic extraction 326 without the use of machine learning/artificial intelligence. In a first example, a spectral signature of the material can be measured by an NIR sensor and that signature can be compared against known signatures associated with non-biogenic material (e.g., plastics, magnets, inert material). In a second example, a sensed moisture level of the material can be measured by a moisture sensor and that moisture level can be compared against known moisture levels associated with non-biogenic material (e.g., plastics). In some embodiments, sensed data from non-image-based sensors can be used without machine learning-based analysis to detect the presence of non-biogenic material. In response to the detection of non-biogenic material (with or without machine learning/artificial intelligence), a sorting device can be instructed to sort the detected non-biogenic material. Examples of sorting devices include robotic grippers and/or controllable arrays of air jets. The instructed sorting device will perform a sorting action on the non-biogenic material and therefore remove it from the stream.

The small biomass material that remains (e.g., on the conveyance system) after quality control ferrous extraction 318, density separation 322, and quality control plastic extraction 326 as well as the large biomass material that was positively sorted by biomass positive sorting 330 and purified/refined via biomass quality control 332 are both transported (e.g., via conveyance or trucking) to drying 336. As described with preparation 226 of FIG. 2, drying 336 dries the combined small and large biomass materials to remove excess moisture 338. Furthermore, the dried biomass is also subjected to fine material reduction 340, which removes small non-biogenic pieces that are under 0.5" in diameter (fines 342). As mentioned above, either drying 336 or fine material reduction 340 may be performed first, depending on the desired formulation of the resulting biochar. Once the biogenic material has completed drying 336 and fine material reduction 340 (e.g., is dried and fines are removed), the prepared material is processed for pyrolysis 344 either onsite at the same sorting facility at which drying 336 took place or shipped to a separate facility to perform pyrolysis 344. As mentioned above, in some embodiments, density separation may be performed (e.g., similar to what is described for density separation 322) after drying to remove (remaining) inert materials prior to pyrolysis 344. Pyrolysis 344 can be performed similarly to pyrolysis 230 of FIG. 2 to generate both biochar 346 and syngas 348.

In some embodiments, the order in which some of the sub-processes within process 300 may be performed is adjustable. For example, quality control ferrous extraction 318 and fine material reduction 340 may be swapped in process 300.

While not shown in FIG. 3, in some embodiments, there could be an additional small fraction size separation (e.g., using screens) subsequent to small fraction separation 316 in which the small fractions stream is further separated into two sub-streams: a first sub-stream that includes small fractions that are 0.25-1" in diameter and the second sub-stream that includes small fractions that are 1-2" in diameter. Where this additional small fraction separation is performed, both resulting sub-streams proceed to separate pathways for parallel quality control ferrous extraction 318, density separation 322, and quality control plastic extraction 326, as described above.

The fraction size on which material is separated and/or the size of the reduced materials provided herein are merely examples and in actual practice, other sizes may be used for separating a stream of materials and/or to which to reduce the size of materials during processes such as process 200 of FIG. 2 and process 300 of FIG. 3.

In some embodiments, process 300 may be implemented at one or more sorting facilities (e.g., different stages of the process flow are performed at different facilities). For example, in a hub and spoke model in which a hub/centralized sorting facility receives sorted/processed material from one or more spoke sorting facilities (e.g., that are located near landfills, where MSW is typically processed), the initial stages (e.g., hazard removal 304, coarse material reduction 308, manual sort 310, ferrous extraction 312) may be performed at general waste management facilities (e.g., "spoke" sorting facilities), and the remaining biochar candidate material shipped to a dedicated drying/biochar facility (e.g., a "hub" sorting facility).

Figure 4:
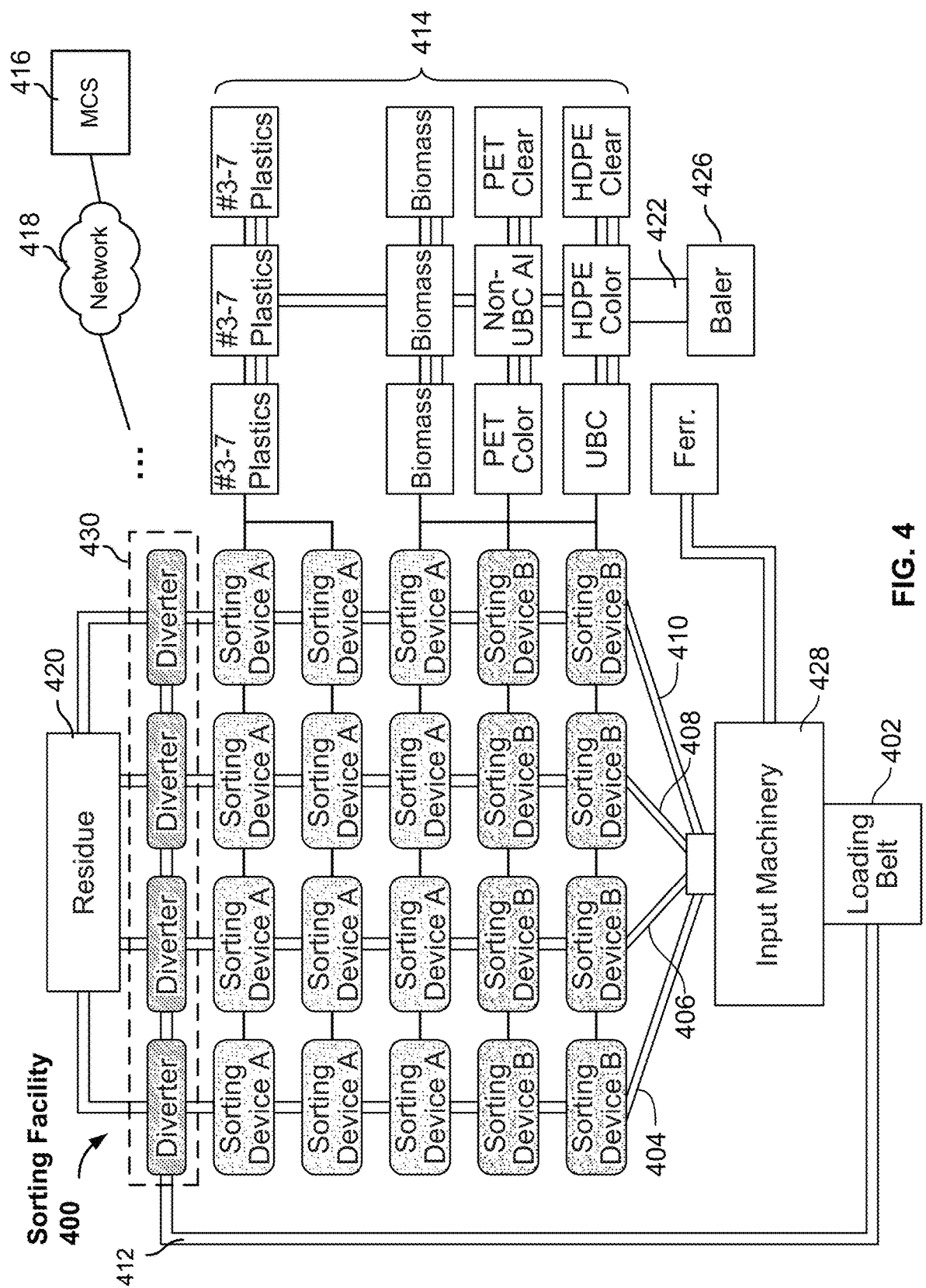
FIG. 4 is a diagram showing an embodiment of a sorting facility for sorting biogenic materials from a heterogenous input material stream.

FIG. 4 is a diagram showing an embodiment of a sorting facility for sorting biogenic materials from a heterogenous input material stream. The example sorting facility of FIG. 4 describes a set of physical machines and conveyance systems, at least some of which are networked with sensors and processors configured to leverage machine learning techniques to identify objects among the sensed images and to enable the physical components to efficiently sort through a material stream to capture target objects. In various embodiments, a "target object" is an object that matches a set of target object criteria. Generally, a "target" object is an object that is desirable to capture for subsequent processing (e.g., generation of biochar) or resale (e.g., as a commodity). As will be described in further detail below, material streams are input at the sorting facility, which sorts through the streams to capture target materials and in some instances, subjects the captured materials to further processing (e.g., preparation and pyrolysis) or outputs bales (e.g., compressed units) of captured objects.

In FIG. 4, the example sorting facility includes multiple, parallel sorting lines. FIG. 4 shows a bird's eye view of four parallel sorting lines (sorting lines 404, 406, 408, and 410) that fan out from a common source, loading belt 402, and also fan back into a common recirculation conveyor, recirculation conveyor 412. Adding parallel sorting lines to a sorting facility will significantly increase recovery throughput through parallelized/simultaneous sorting activity. Furthermore, each of the sorting lines can be implemented using a series of modular sorting units, which can reduce costs and improve consistency of material sortation. Generally, a sorting facility device (e.g., input machinery, a sensor device, a conveyor device, a sorting device, a bunker, a baler, a residue compactor) that receives an object earlier in the sorting line than another sorting facility device is referred to as being "upstream" of the latter sorting facility device. Similarly, the latter sorting facility device is referred to as being "downstream" of the former sorting facility device.

Each sorting device is coupled to/in communication with a sensor device (e.g., a camera) and MCS 416 over network 418 that is configured to, using trained machine learning models, detect and characterize the objects that are being moved towards it by a conveyor device. In some embodiments, network 418 comprises one or more local area networks (LANs), to enable communication between the sorting facility components. Different LANs may be interconnected, or LANs may be dedicated and segmented for a specific set of devices (e.g., one processor, one sensor, one sorting device on a separate LAN). In some embodiments, network 418 also includes a connection to one or more wide area networks (WANs), enabling communications and data transfer between processors located in remote server locations (e.g., cloud services) and/or processors located at remote sorting facilities. In some embodiments, a machine learning model used by MCS 416 may comprise one or more of the following: a neural network algorithm, a reinforcement learning algorithm, a support vector machine, a regression (logistic or otherwise), a Bayesian inference, or other statistical techniques. MCS 416 can be implemented as a single physical node (e.g., computing device) using one or more processors that execute computer instructions and where the sorting facility devices communicate with the single node over network 418. For example, a processor is capable of running software, firmware, or FPGA-type instructions. Alternatively, MCS 416 can be implemented as a network of two or more physical nodes (e.g., computing devices) comprising one or more processors to execute computer instructions and where the network of two or more physical nodes is distributed throughout the facility. In the event where there is a distributed network of physical nodes that form MCS 416, any number of networked vision sensors and physical nodes of MCS 416 can be included in logical groupings that are sometimes referred to as "machine learning (ML) vision subsystems." For example, each ML vision subsystem comprises a processor configured to execute machine learning models for object identification, and includes memory, networking capabilities, and a high-resolution camera. A processor of a physical node implementing MCS 416 can determine the location of (e.g., a bounding box around, a mask around, a pixel region occupied by) each object or set of materials that is detected within an image captured by a vision sensor and/or apply machine learning to a detected object/region of materials to determine one or more characterizations about the object/materials. Example characterizations include a biogenic related classification, a material type, a shape, a size, a mass, a priority, a condition, a form factor, a color, a polymer, and/or a brand.

MCS 416 stores physical layout information of the sorting facility devices within the facility. The physical layout information describes at least the position of each sorting facility device such as their location within the facility and their relative position within a sorting line. MCS 416 uses this physical layout information to enable reconfiguration of the appropriate portion of sorting facility devices (e.g., sorting devices) in response to feedback data collected at the facility (e.g., detected purity, composition, and/or other attributes of sorted objects), in response to operator input, and received from a source that is external to the facility (e.g., a third-party service, another facility, and/or a central MCS).

In sorting facility 400, an input stream of heterogenous materials (e.g., MSW) may be loaded onto loading belt 402 and ingested in the facility at input machinery 428. While not all detailed in FIG. 4, input machinery 428 may preprocess the input stream with one or more of the following: performing hazard removal (e.g., hazard removal 204 of FIG. 2, hazard removal 304 of FIG. 3), reducing the size of the materials (e.g., size reduction 208 of FIG. 2, coarse material reduction 308 of FIG. 3), including manual sorting (e.g., manual sort 310 of FIG. 3), performing ferrous extraction (e.g., first non-biomass removal 210 of FIG. 2, ferrous extraction 312 of FIG. 3), and performing size separation (e.g., size separation 214 of FIG. 2, small fraction separation 316 of FIG. 3). The preprocessed input stream of heterogenous materials is then distributed as sub-streams (e.g., associated with different material sizes and/or associated with different material classifications/types, as described above) across sorting lines 404, 406, 408, and 410.

In some embodiments, biogenic material extraction 104, quality control 108, and biogenic material composition sensing 106 of process 100 of FIG. 1, biomass positive sorting 220 and biomass quality control 222 of process 200 of FIG. 2, and biomass positive sorting 330 and biomass quality control 322 of process 300 of FIG. 3 associated with extracting (e.g., purified, high-quality) biogenic materials may be implemented using at least some of sorting lines 404, 406, 408, and 410. In some embodiments, second non-biomass removal 216 of FIG. 2, quality control ferrous extraction 318 of FIG. 3, density separation 322 of FIG. 3, and quality control plastic extraction 326 of FIG. 3 associated with extracting non-biogenic material out of a stream of materials may be implemented using at least some of sorting lines 404, 406, 408, and 410.

In example sorting facility 400, each of sorting lines 404, 406, 408, and 410 includes a respective series of conveyor devices that are each associated with a corresponding sorting device and/or sensor device (not shown in FIG. 4). For example, while not shown in FIG. 4, sensors can be placed over or to the side of the conveyor devices such that they can capture measurement/sensed data on the stream of material that is being transported along the conveyor devices. Examples of sensor types include, but are not limited to, cameras, near infrared (NIR), X-ray fluorescence, mid-wavelength infrared, shortwave infrared, acoustic, moisture, depth sensors (based on time of flight or stereoscopic imagery), hyperspectral sensors, inductive, magnetic, and capacitive sensors. The sensors can be used individually or arranged in an array. The sensed data can be analyzed by MCS 416 to detect the objects and characterize their attributes/classifications within the sensed data. Sorting facility 400 may be used to sort both biogenic and non-biogenic materials from an input stream. Given that biogenic material may vary in appearance (e.g., even the same organic item may appear differently over time as it decomposes), a machine learning model for detecting objects that is used by MCS 416 could have been trained on training data that includes images of the same organic item across different stages of decomposition (e.g., at a not rotten stage, at a later rotten stage). The machine learning model could also have been trained on synthetic images that were generated from a given base image of an organic item based on computer determined projections of its appearance over different stages of decomposition. The trained machine learning model should be able to interpolate across the training data to recognize a variety of biogenic materials despite their wide range of appearances. Furthermore, given that biogenic material may be clustered together (e.g., food waste) and lack easy to define individual boundaries, in some embodiments, the machine learning model that is used to analyze images of a stream of materials is trained to perform segmentation on the images. As will be described in further detail below, the machine learning model may be trained to assign a material classification to each determined image segment. For example, the material classification of a segment may identify whether the segment includes biogenic material and if so, a particular type/category of biogenic material. MCS 416 may also use machine learning models that have been trained to identify the bounding box or mask around objects (e.g., non-biogenic objects for which the boundary of which is more visually apparent) and then determine attributes (e.g., material type, condition, shape, color) of each such object. As such, the sensed data of the material stream is used by MCS 416 to characterize the type/classification of each object/set of materials within the input stream. MCS 416 then compares the type/classification of each object/set of materials to a set of sorting criteria to determine whether the detected object/set of materials should be sorted/acted upon by a sorting device within the sorting line and if so, instructs the sorting device to perform a sorting operation on the object/set of materials. Targeted objects/sets of materials are tracked such that a sorting device can be instructed to fire/act upon the targeted items when the objects/sets of materials are within their respective active/firing/capture region. In some embodiments, singulation mechanisms are used to singulate objects in each sorting line such that a sorting device need only target individual/singulated objects.

Sorting facility 400 may be implemented to physically sort/separate an input stream of heterogenous materials (e.g., MSW) into both biogenic ("biomass") and non-biogenic (e.g., aluminum, plastics) bunkers. As shown in FIG. 4, each of the sorting devices is labeled as "Sorting Device A" or "Sorting Device B." Each such sorting device may refer to an instance of a type of a sorting device with a different sorting mechanism (e.g., an array of air jets, suction, pusher, robotic arm, or otherwise) and/or an instance of a sorting device with a particular set of configured parameters (e.g., suppression thresholds, target material type(s), and target object identification thresholds). In this example, each instance of "Sorting Device A" or "Sorting Device B" in each of sorting lines 404, 406, 408, and 410 is configured to perform a sorting operation on ("fire on") target objects of a particular type of material/classification to "capture" those objects. The fired-on target objects are removed from the stream of materials that is being transported through each sorting line and are then deposited onto a target conveyor (e.g., that is moving in a direction away from a direction in which materials are moving along the sorting lines) or through transfer tubes. Each target conveyor or transfer tube is configured to transport captured target objects to respective ones of bunkers 414 for storing captured materials of a particular material type. The specific example types of materials that are being sorted in FIG. 4 are related to biogenic materials ("biomass") and also other materials such as recyclable materials. As shown in the example of FIG. 4, the target objects that are deposited onto the target conveyor(s) that run through one row of "Sorting Device B" sorting devices (across sorting lines 404, 406, 408, and 410) are transported to those of bunkers 414 for storing "UBC" (used beverage container) type materials, "HDPE Color" (High Density Polyethylene with color) type materials, and "HDPE Clear" (High Density Polyethylene without color) type materials. The target objects that are deposited onto the target conveyor(s) that run through another row of "Sorting Device B" sorting devices (across sorting lines 404, 406, 408, and 410) are transported to those of bunkers 414 for storing "PET Color" (polyethylene terephthalate with color) type materials, "Non-UBC Al" (non-used beverage container aluminum) type materials, and "PET Clear" (polyethylene terephthalate without color) type materials. The target objects that are deposited onto the target conveyor(s) that run through a first row of "Sorting Device A" sorting devices (across sorting lines 404, 406, 408, and 410) are transported to those of bunkers for storing "Biomass" type/classification materials (e.g., food waste, yard waste, wood, contaminated paper products). The target objects that are deposited onto the target conveyor(s) that run through a second and a third row of "Sorting Device A" sorting devices (across sorting lines 404, 406, 408, and 410) are transported to those of bunkers 414 for storing "#3-7 Plastics" type materials.

As mentioned above, sorting devices of sorting facility 400 are designed to fire on/perform sorting operations on biogenic material by actuating a sorting mechanism (e.g., paddle, hydraulic pusher, jet of compressed air, temporary vacuum) to separate and/or isolate both decomposed material as well as intact objects (e.g., bones, 2×4's, tree branches) into designated biomass bunkers or onto designated biomass pathways. One particular type of sorting device comprises a controllable array of air jets. In some embodiments, an instance of a controllable array of air jets sorting device can be positioned above the end of a conveyor device and fire down on targeted items (e.g., biogenic material in a positive sort) as they fall off of the conveyor device. The trajectory of the fired upon items is changed such that they fall into a collection container or onto a target pathway (another conveyor device) and the trajectory of the not fired upon items are not changed such that they land on a next conveyor device in the series (until they are collected after no longer being circulated over conveyor devices). In another example, the controllable array of air jets is located to the side of a conveyor module and fire on targeted items from the side. The fired upon items will fall into a collection bin on the other side of the conveyor device or onto a target pathway (another conveyor device) and the not fired upon items are collected after no longer being circulated over conveyor devices. One reason to apply force on the targeted items (and biogenic materials in particular) using the "downcut" configuration, which will be described in further detail below, or on their sides is to prevent the materials from passing over and potentially clogging the sorting devices (e.g., air valves). Other examples of mechanisms in sorting devices besides air jets that may be used in sorting facility 400 include pushing mechanisms, paddles, actuated suction grippers, shunters, and vacuum tubes. These are among several examples of sorting devices, among others. These devices may be used individually or in combination in the same facility.

In some embodiments, row 430 of "Diverter" sorting devices (across sorting lines 404, 406, 408, and 410) may each be configured to place undesirable objects (objects that do not match target object parameters) that had not already been removed from the stream by an upstream sorting device on to a conveyor device that transports such objects into residue 420 (e.g., a trash compactor). In performing this type of "negative" sort involving performing sorting actions on undesirable objects, row 430 of "Diverter" sorting devices is configured to allow desirable objects (target objects) to be deposited from their respective sorting lines onto recirculation conveyor 412, which is configured to transport the selected objects back to the source of sorting lines 404, 406, 408, and 410, and loading belt 402 for another pass at being sorted. The recirculated materials are then processed through all the shared components of the facility (e.g., the shredder, magnet) before being dispersed among the four sorting lines, sorting lines 404, 406, 408, and 410, for a subsequent pass through those sorting lines. "Diverter" sorting devices in row 430 may each be implemented by an array of air jets (e.g., air valves) that selectively fire on and thus change the trajectories of the undesirable objects. In some embodiments, the same stream of materials may be recirculated through the sorting lines 404, 406, 408, and 410 until a set of recirculation criteria is met.

In various embodiments, the sorting facility devices of the sorting facility can be networked to enable object recognition and tracking within a facility, which affords numerous new benefits. In some embodiments, the sorting facility devices are addressable by other components within the system over network 418. As a result, information (e.g., including object type, trajectory information, etc.) related to an object of interest, for which its image is captured and then detected within the image by a sensor and MCS 416, may be made available to any other device, upstream or downstream, within the facility. In a simple example, the object-related information is made available to a downstream sorting device to cause the downstream sorting device to perform a sorting operation on the object to remove it from the material stream and into a corresponding one of bunkers 414.

In various embodiments, bunkers 414 store captured target objects that were removed by a sorting device from the material stream. Due to MCS 416's ability to communicate with the sorting facility devices (e.g., sensor devices, conveyor devices, and/or sorting devices) within the facility, MCS 416 is able to track which and how much of fired upon objects (e.g., objects on which a sorting device had performed a sorting operation) and that were successfully captured have been deposited into each of bunkers 414. As such, MCS 416 can use this tracked bunker content information to determine the current composition of biogenic materials/biomass within a certain bunker. As will be described in further detail below, in some embodiments, MCS 416 can determine the chemical composition of sorted biogenic materials within a certain bunker by tracking which biogenic materials are fired upon (e.g., and also successfully sorted), tracking the mass of such sorted materials, and by referring to a database that stores chemical properties (e.g., breakdowns) of each type of biogenic classification (e.g., food waste, yard waste, wood, paper, cartons, cardboard). MCS 416 can compare the current chemical composition of the sorted biogenic materials that have been deposited into a bunker so far to a desired formulation (e.g., associated with the mixture of sorted biomass, associated with a desired biochar to be produced from the sorted biomass, and/or associated with a desired syngas to be produced from the sorted biomass) and if there is a discrepancy (e.g., a deficiency of a certain chemical), MCS 416 can programmatically trigger events or a reconfiguration of upstream sorting devices to result in an update of the chemical composition within the bunker. In a first example, the sorting parameters of the upstream sorting devices (e.g., which subsequent objects/materials to sort/add into the biomass bunkers) can be modified to result in the selection of biogenic materials with the needed chemical properties to be deposited in that bunker to update the overall chemical composition within the bunker to better meet the desired formulation. In a second example, a bunker including sorted paper or another lignocellulosic material can be emptied onto a pathway that conveys that material into a mixture/bunker of biogenic material to change the mixture's overall chemical composition. As such, sensed data downstream provides a stream type of feedback, allowing the upstream sorting devices and infeed controls to vary the inputs based upon what downstream sensors capture and are analyzed by MCS 416.

In some embodiments, auditing can occur at different locations within sorting facility 400. A first type of auditing or quality control can occur along the sorting lines (e.g., 404, 406, 408, and 410) after a quality control sensor is placed near (e.g., over) a pathway (one or more conveyor devices) designated to transport target materials (e.g., biogenic materials) that have been previously diverted (via positive sorting) from a heterogeneous stream by a sorting device. The sensed data (e.g., image) captured by the quality sensor is then evaluated by MCS 416 for the presence of materials other than what is designated for that pathway (e.g., metals or plastics on the conveyor device). If such undesirable materials are detected, then MCS 416 can instruct a downstream quality control sorting device to remove the non-target materials (via negative sorting) from that pathway. A second type of auditing can occur at a bunker of sorted biogenic material ("biomass") to determine whether and which additional material ("additives") should be added. In some embodiments, a moisture probe is configured to be dynamically inserted into and/or a moisture sensor is located within a bunker designated for collecting sorted biogenic material (e.g., before the material is dried or stored), so that MCS 416 can then determine if it needs to supplement the content with more lignocellulosic material (e.g., paper, cardboard), or how long it needs to be dried for (which is energetically intensive). In some embodiments, the sorting criteria for targeting and/or routing of material through a sorting facility are reconfigurable such that the reading on the moisture sensor can be used to determine whether additional material (e.g., that contains lignocellulosic material) should be sorted from the input material stream and also routed to be added into the bunker of sorted biogenic material. In some embodiments, additive materials may also be added from known streams originating outside of the input material stream that was received at sorting facility 400. In this way, sorting facility 400 is designed to produce a capacitance of the biogenic material and the additive materials in such a way that a consistent biogenic material blend is produced despite varying infeed composition. In some embodiments, additives may also be materials that were not previously part of the input waste stream, such as salt or acidic liquids like vinegar to prevent the decomposition process (for instance, "pickling" a mixture).

In some embodiments, MCS 416 is configured to programmatically trigger the emptying of any particular bunker of bunkers 414 such that its emptied out contents can be transported via conveyors (e.g., conveyor 422) to subsequent processes (e.g., into a dryer and/or fines reduction area, which are not shown in FIG. 4) or into baler 426, which is configured to compress materials into rectangular bales. For example, the produced bales can then be sold and/or transported to a buyer for additional processing (e.g., recycling, packaging and burial). In a first specific example, biogenic materials that are emptied out of biomass collection bunkers can be transported (e.g., via conveyance or trucking) to subsequent processes such as drying, fines reduction, and/or pyrolysis (for biochar and syngas production) either onsite at the same facility or at another facility. In a second specific example, non-biogenic materials such as commodities like plastic, aluminum, and paper products can be baled into compressed units (bales) and then sold to buyers (e.g., who will recycle items).

In some embodiments, clogs and debris on the equipment (e.g., conveyor devices, sorting devices) of sorting facility 400 need to be prevented or removed to maintain sorting performance and reduce the need for repairs. In a first example of maintaining the cleanliness of equipment (from being clogged/jammed by biogenic materials), sorting devices are placed over (e.g., to perform a "downcut" configuration of air-based sorting) or to the side of the material stream so that the material does not fall into the sorting devices, as mentioned above. In a second example of maintaining the cleanliness of equipment, a belt scraper is added on the bottom side of one of the pulley ends of each conveyor device to scrape off collected residue into a residue container on the ground. In some embodiments, jams/clogs along the sorting lines can be programmatically detected. In an example, the status of a variable frequency drive (VFD) of a conveyor device can be periodically collected by MCS 416. If a VFD parameter status, such as current, is greater than a threshold, then it indicates that the motor has to work harder to turn the belt, potentially owing to organic material getting into the head pulley or under the belt. This detection will in turn cause MCS 416 to trigger an alert and direct an operator to that asset for repair.

Figure 5:
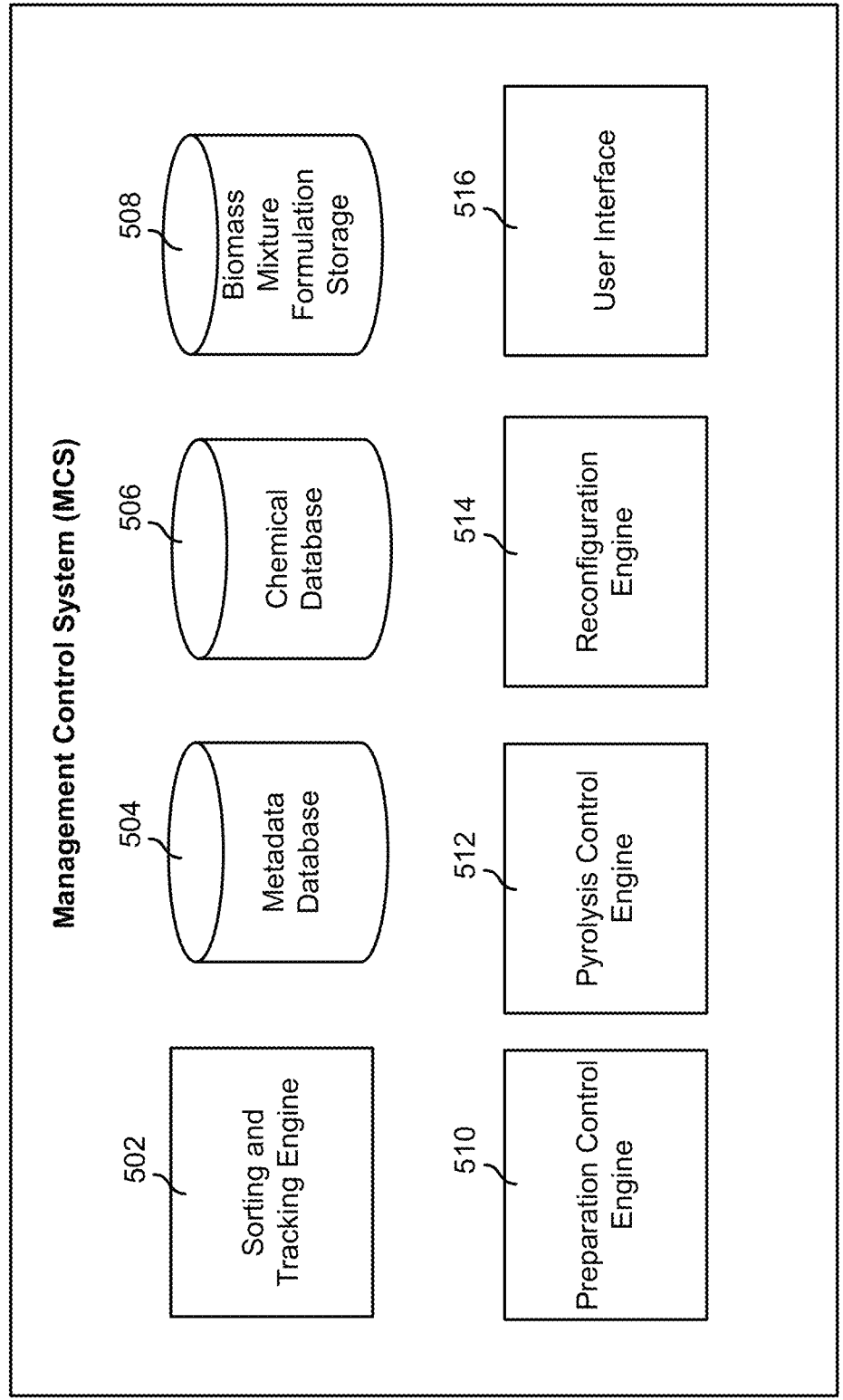
FIG. 5 is a diagram showing an example of a management control system (MCS) in accordance with some embodiments.

FIG. 5 is a diagram showing an example of a management control system (MCS) in accordance with some embodiments. In the example of FIG. 5, the MCS includes sorting and tracking engine 502, metadata database 504, chemical database 506, biomass mixture formulation storage 508, preparation control engine 510, pyrolysis control engine 512, reconfiguration engine 514, and user interface 516. Each of sorting and tracking engine 502, metadata database 504, chemical database 506, biomass mixture formulation storage 508, preparation control engine 510, pyrolysis control engine 512, reconfiguration engine 514, and user interface 516 may be implemented using one or more of software and/or hardware comprising one or more processors. In some embodiments, MCS 416 of FIG. 4 can be implemented with the example MCS described in FIG. 5.

Sorting and tracking engine 502 is configured to receive sensor data with respect to objects from sensors and then apply machine learning to the images to detect the objects and the attributes of the objects. Examples of sensors include image/vision sensors, NIR sensors, acoustic sensors, moisture sensors, depth sensors (based on time of flight or stereoscopic imagery), hyperspectral sensors, inductive sensors, magnetic sensors, and capacitive sensors. In some embodiments, sorting and tracking engine 502 executes one or more of the following types of software: a neural network algorithm, reinforcement learning algorithm, support vector machine, regression (logistic or otherwise), Bayesian inference, and other statistical techniques. In particular, sorting and tracking engine 502 is configured to run one or more machine learning models that are configured to identify object(s) within an image received from an image sensor (e.g., that are placed above a conveyor device). In some embodiments, the machine learning model(s) running at sorting and tracking engine 502 are configured to determine the location of (e.g., the bounding box around and/or the outline of) objects and the attributes of the objects in the received image. In some embodiments, the machine learning model(s) running at sorting and tracking engine 502 are configured to use non-image data, such as depth sensing or moisture sensing, in conjunction or alternative to the image data to determine certain object attributes such as material type and/or estimated mass.

Using a machine learning model that can identify the bounding box/outline/mask around each object in an image is particularly helpful when the objects have well-defined, discrete boundaries around each object, such as non-biogenic objects (e.g., bottles, cans, containers). However, biogenic materials (e.g., due to their decomposable nature, ability to clump together, and/or moisture content) tend to have contiguous and also non-discrete boundaries. As such, to improve the detection of biogenic materials, in various embodiments, in addition to identifying the bounding box or mask around (discrete/standalone) objects as described above, sorting and tracking engine 502 is also configured to perform segmentation on an image and then assign a biogenic-related classification to each segment. In some embodiments, a machine learning model for performing image segmentation can be trained through neural network training techniques (e.g., by exposing the model to ground truths of images of a comparable nature with labeled segmentations in pixel-space representation of items). In various embodiments, image segmentation involves analyzing the pixels in an image and partitioning the image into regions, where each region comprises a set of pixels and represents the boundaries of a set of materials. Each of the pixels in the same region within the image are similar because they share one or more common properties (e.g., color, intensity, or texture) and different neighboring regions have pixels that are different with respect to some properties. As such, sorting and tracking engine 502 can apply a machine learning model to analyze each segment/region within an image to assign a biogenic-related classification to that segment/region. Unlike the mask around potentially discrete, non-biogenic objects, an image region can be irregularly shaped and sized. For example, examples of biogenic-related classification include whether the segment/region includes pixels that are likely biogenic materials at all and if so, the particular category of biogenic material that the pixels represent. Examples of categories of biogenic material include food waste, yard waste, wood, paper, cartons, and cardboard. Other examples of categories of biogenic material include degrees of wetness that are determined based on coloring, reflectivity, and visible moisture. Put another way, by leveraging image segmentation, the set of materials in each region of an image can be classified rather than identifying standalone objects within the image. In some embodiments, panoptic segmentation, which combines semantic and instance segmentation, is used. Semantic segmentation is when each image region is classified into a (e.g., biogenic-related) classification. Instance segmentation is when each image region is classified as a distinct instance of a given (e.g., biogenic-related) classification. For example, where panoptic segmentation is used, a first image segment can be classified as a first instance of yard waste within the image and a second image segment (within the same image) can be classified as a second instance of yard waste within the image. In some embodiments, a machine learning model ingests images and outputs a bitmask image where each channel represents a class, and each pixel represents probability that that pixel has that class in it. The segmented image can be represented as a "segmentation map" that shows each region in the color of its assigned classification and/or instance. In some embodiments, the "crowd problem" problem, where a noisy visual background is provided with particular objects to pick out from the scene, is addressed. Here, the neural network ingests images and produces semantic segmentation outputs for "background classes" and object detection with segmentation outputs for "particular object." Semantic segmentation helps with the crowd problem by making classifications based on pixel-space, instead of attempting to isolate objects through object localization. This can help with the "crowd problem" since the model is not trying to isolate a certain region (e.g., the outline or "mask" of a bottle) around an object and then predicting the object that was in that region. Instead, the model is predicting what a given region of the image consists of based on the pixels (which works better with non-discrete item boundaries).

In some embodiments, sorting and tracking engine 502 is configured to identify specific objects using received object "models" (e.g., parameterization/weighting factors to enable ML recognition of a specific object) that are ingested programmatically, from third-parties, or by an operator. A specific example is the ability to ingest SKU-level descriptors of objects, thereby enabling sorting and tracking engine 502 to recognize and sort very specific objects (such as a chip can of one brand vs a chip can of a second brand). In some embodiments, SKU-level descriptions are derived by sorting and tracking engine 502 from a learning process whereby known objects are input to the system, automatically labeled with designated categories, and a neural identification process is automatically built based on object characteristics with the descriptors encoded as neural network parameters.

In various embodiments, sorting and tracking engine 502 is configured to use the determined object (individual objects or a collection of objects within an image segment/region) attributes (e.g., classifications, material type, object type, object shape, object dimensions, form factor, object color, mass, volume, and/or brand) to determine the chemical composition of the object. In some embodiments, sorting and tracking engine 502 is configured to determine the chemical composition of the object by querying chemical database 506. In some embodiments, chemical database 506 comprises a reference library that stores for each material type, biogenic-related classification, and/or object type, a set of chemical/elemental characteristics (e.g., the amount of carbon, hydrogen, ash, sulfur, nitrogen, oxygen, water, chlorine, fluorine, metals, potassium, etc.), proximate ultimate data, composition item types/classes, label adhesive contents, melt points, and ideal conversion processes for each physical unit of the object (e.g., a unit of mass or volume). By using the reference provided by chemical database 506, sorting and tracking engine 502 can estimate the chemical properties and breakdown of the object. In some embodiments, the machine learning models used by sorting and tracking engine 502 to detect and/or characterize objects/regions within images have also been trained on identifying the chemical composition or at least moisture content (e.g., as determined using NIR sensors) within each object/region within an image using the pixels within the corresponding bounding box/mask/region of the image.

Sorting and tracking engine 502 is configured to compare the determined object attributes and chemical composition to a reconfigurable set of target object criteria to determine those object(s) that match the criteria as "target objects." For example, target object criteria may describe the object attributes and/or chemical compositions of objects that are desirable to be sorted/harvested for further processing (e.g., baled and to be sold or pyrolyzed to generate biochar/syngas). For example, sorting and tracking engine 502 can target objects based upon their ability to contribute to ultimate desired biochar formulation/characteristics (e.g., specified pH, moisture content, relative carbon content, etc.). For example, chlorine-, fluorine-, or sulfur-rich materials may be deemed less desirable, tagged as such in chemical database 506, and then sorted out by the system (e.g., to not be included in the captured biogenic material to be turned into biochar). Other undesirables might include objects with high levels of metals, potassium, and/or nitrogen. Conversely, certain chemical compounds may be highly desirable and would be positively sorted based upon tags listed in chemical database 506. In a first example, the target object criteria may identify specific plastic types to target and become incorporated into the biomass feedstock for the purpose of increasing hydrocarbon content and/or to increase the calorific or hydrogen heating value of the resulting syngas. In a second example, the target object criteria may identify lignocellulosic material to target to increase the chemical stability and carbon content of the resulting biochar that is to be produced from the sorted biogenic materials. In a third example, increased alkalinity of the biochar may be desirable for ultimate inclusion in soil amendments/landfill covers. To increase alkalinity in sorted biogenic material that will be used to produce biochar for soil amendments and/or landfill covers, yard waste or other mineral-rich materials (e.g., calcium, magnesium) may be targeted. The flexibility that is provided by the reconfigurable target object criteria used for targeting/sorting objects in the sorting facility allows the end biochar mix to be continuously characterized and therefore formulated dynamically. "Target objects" are objects (or set of materials) which sorting and tracking engine 502 is to instruct a sorting device, which is located downstream from the sensor that had captured sensed data on the materials, to perform sorting operations on and to deposit the sorted/captured objects directly into a corresponding bunker or onto a conveyor device that conveys captured objects to the corresponding bunker. As will be described in further detail below, in some embodiments, when a sorting device that includes a controllable array of air jets is used to fire on (e.g., in a downcut configuration) a target object, the location of the object along the width of the conveyor device and/or an approximated boundary/shape description can be used to specifically instruct how the air jets should fire on the object. For example, the air jets of the controllable array can be controlled to provide a time-varying stream of air on the target object that corresponds to the approximated boundary/shape description of the object, which will be described in further detail below.

In some embodiments, sorting and tracking engine 502 is configured to determine, for each target object, whether the sorting/removal of that target object from the stream of objects should be suppressed (e.g., avoided), at least in part, using a reconfigurable set of suppression criteria/parameters. Certain sorting mechanics of removing a target (desirable) object from a stream include physically deflecting (e.g., using a vacuum, a positive airflow, or a physical mechanism) the target object into a bunker or a target conveyor device. However, it is possible that the physical deflection aimed at the target object could inadvertently also deflect a non-target (undesirable) object into the bunker intended for the target object. The result of inadvertently deflecting a non-target object into the bunker is to decrease the purity rate of objects collected in one or more bunker(s), which is undesirable. For example, the "purity rate" corresponding to objects deposited into one or more bunkers can be defined as either 1) the total number of collected target objects over the total number of all objects collected at the bunker(s) or 2) the total weight of collected target objects over the total weight of all objects collected at the bunker(s). Typically, the greater the purity rate of objects collected at the bunker(s), the greater the (e.g., economic) value that is associated with the collected objects. As such, it is undesirable to allow neighboring non-target objects to be inadvertently deposited into a bunker when a sorting device fires on a target object because doing so will lower the purity rate associated with the objects collected at the bunker. For example, the set of suppression criteria describes the conditions for when a sorting device should not fire on a target object (to reduce the risk that the non-target object also inadvertently becomes deposited into a bunker). In a specific example, the set of suppression criteria may describe that if a non-target object is located within a predetermined distance from a target object and that the size of the non-target object is greater than a predetermined size, then the sorting device should not be instructed to remove the target object (to reduce the risk that the non-target object becomes deposited into a bunker) (i.e., the removal of that target object should be suppressed). For example, the set of suppression criteria/parameters can be made to be more "tolerant" by shortening the predetermined distance between the target object and a non-target object that would trigger suppression (i.e., shortening the predetermined distance would cause the sorting device to perform sorting operations more frequently/aggressively, while increasing the risk that undesirable objects are captured). Also, for example, the set of suppression criteria/parameters can be made to be more "stringent" by increasing the predetermined distance between the target object and a non-target object that would trigger suppression (i.e., increasing the predetermined distance would cause the sorting device to perform sorting operations less frequently/less aggressively, while decreasing the risk that undesirable objects are captured). In some embodiments, sorting and tracking engine 502 is configured to determine which target objects should be removed and which should not be removed by a sorting device using the set of suppression criteria. In some embodiments, sorting and tracking engine 502 is configured to store data to indicate the target objects for which removal (e.g., via the performance of a sorting action) was determined by sorting and tracking engine 502 to not be performed by a sorting device.

Sorting and tracking engine 502 is also configured to monitor the characteristics and/or quantity (e.g., mass) of captured objects that are deposited into one or more bunkers. Sorting and tracking engine 502 is able to monitor the characteristics and/or quantity of captured objects that are deposited into bunkers based on its instructions of which target objects to sort, its auditing of which target objects were successfully captured, and/or its usage of vision sensors to capture images of objects that are being deposited into bunkers. As such, sorting and tracking engine 502 is able to utilize the combination of machine learning object recognition capabilities and dynamically controllable sorting devices to manage the purity rate of, quantity of, and/or to specify the chemical composition of the sorted objects/materials (e.g., biogenic materials). In some embodiments, each blend of (e.g., biogenic) materials or their chemical composition thereof in a bunker that may be desired is described in a (e.g., predetermined) stored formulation (e.g., stored in biomass mixture formulation storage 508). Put another way, sorting and tracking engine 502 may target objects for inclusion or modification of the sorted mixture of biogenic materials based upon desirability for downstream biochar and/or syngas creation. For example, paper and similar substances (e.g., lignocellulosic material) may be beneficial in the biochar feeds in controlled amounts. As described herein, sorting and tracking engine 502 can use a neural network trained to characterize objects, recognize them in the input stream, and sort them in or out of the sorted mixture of biogenic materials based upon measured or calculated values present in the current sorted mixture of biogenic materials for downstream biochar production. Sorting and tracking engine 502 may be used to monitor percentages of these materials by mass or volume from sensor data (e.g., machine vision sensors), and reconfiguration engine 514 can adjust sorting parameters for these materials based on dynamically changing targets.

Metadata database 504 is configured to store metadata related to detected/characterized objects and sorting facility devices. In some embodiments, metadata database 504 comprises a software database. Examples of such databases include a relational database (e.g., SQL), a text-based list of parameter values, a time series (unstructured) database, data lake (e.g., Google Cloud Storage), or other non-sequence database. The database may be used to manage configuration and dynamics parameters associated with sorting facility devices (e.g., sensors, sorting devices, shredders, screens), harvesting and path planning parameters, robotic sorting configurations, neural net or object metadata (e.g., bounding box/mask values, hierarchical structure, components in training sets, etc.), or any other data used by the system that requires structured lookup and management. In some embodiments, neural networks may be stored in a data lake structure (e.g., in a cloud-based data lake). In some embodiments, object classifications may be stored unstructured in a data lake (e.g., Google Cloud in ROSBAG format), as well as in a parsed, time-series view, or in a structured asynchronous view. Unstructured databases are used for managing logs, errors, training data, real-time feeds, camera data and metadata, and other information that is streamed in real- or near real-time. By way of example, the metadata pertains to identified objects traversing a conveyance system, their attributes, and information regarding placement and pick or harvesting. A unique identifier is included in the object's metadata, along with attribute information from the ML vision system. The attribute information comprises features that are derived by machine learning (e.g., classifications, material type, object type, object shape, object dimensions, form factor, object color, mass, volume, orientation, liquid, affixed labels, fracture patterns, plastic type) as well as chemical compositions that are looked up from a reference library (e.g., chemical database 506 based on the attribute information). In addition, the metadata may include information related to the position of the object(s) relative to the ML vision system and sorting devices. Other object information such as bounding boxes, object centroid, and other spatial parameters may also be included in the object metadata. As objects are sorted/harvested, additional data is generated and included in the metadata. This may contain times and positions for target harvesting actions, as well as information related to successful and unsuccessful harvesting actions. Note that these examples represent only a small portion of the metadata of the system. Other areas where metadata is used, transmitted, and stored may include, for example: operational data, raw sensed data, error logs, metadata associated with panoramas and the panoramas or images themselves, etc. For example, operational data associated with a robotic arm sorting device may be sent as a part of the management system. This metadata includes parameters such as projected component lifespan, harvest efficiency, timelines or other information related to object harvesting, component lubrication, temperature, and other performance metrics. In each case, metadata may be generated by a system component (e.g., by the sorting device's local processor, or by the MCS) and stored locally, or transmitted to a remote processor and stored remotely.

Preparation control engine 510 is configured to determine whether to add additive material into the sorted biogenic materials (e.g., inside one or more bunkers for collecting biomass) to update the overall composition of the mixture (e.g., to most closely meet a desired formulation of the sorted biogenic materials). In the event that additives should be added to the sorted biogenic materials, in some embodiments, preparation control engine 510 is configured to trigger the addition of specific additives and amounts thereof by causing sorted material that was not sorted into the biogenic mixture to be deposited into the biogenic mixture (e.g., via emptying out at least a portion of another bunker and causing those materials to be conveyed to the biogenic mixture or via causing reconfiguration engine 514 to reconfigure the sorting facility devices to target the additive materials to be deposited into the biogenic mixture). Lignocellulosic materials (e.g., paper) are often deemed unrecyclable due to contamination. One advantage of using the unrecyclable contaminated lignocellulosic materials to change the chemical composition of sorted biogenic materials is that doing so would prevent such material from otherwise being discarded in residue. Furthermore, lignocellulosic materials traditionally have significantly less moisture, which helps to drive efficiencies in any thermochemical conversion (e.g., pyrolysis) and to control the H/C (hydrogen/carbon) ratio. Water has a lot of oxygen and hydrogen, the former being very consequential for pyrolysis (combustion without the presence of oxygen), the latter being consequential for carbon sequestration eligibility. For many sequestration techniques, the carbon is not effectively sequestered if the biochar produced has an H/C ratio of more than 0.4. The reason being that the presence of hydrogen enables the material to be more reactive and re-enter the carbon cycle more easily. Common "pure" organics such as coffee grinds or food waste have a high water/moisture content (e.g., up to or above 80%). By contrast, wood has an average moisture content around 20%. Traditional fiber products and cardboard are both made up of cellulosic lignin (a wood-derived product), and have common moisture values of around 20%. As a result, lignocellulosic feedstocks (e.g., paper, cardboard, wood) are good candidates to add into the refined/sorted biogenic material for balancing out the moisture content of the mixture and bringing the H/C ratio of the mixture down to the desired threshold (e.g., below 0.4). As mentioned above, in some embodiments, a moisture probe/sensor can be inserted into the refined/sorted biogenic material before or after the addition of the lignocellulosic additives to check for the current moisture level within the mixture and to dynamically determine whether additional additives are needed to reach a desired moisture level. Adding drier additives to the refined/sorted biogenic material is also very useful for process flow efficiency, since biochar processes (and thermochemical processes more generally) typically require a drying stage to ensure that the material entering the pyrolysis process is sufficiently dry. Besides reducing the moisture content and reducing the H/C of the refined/sorted biogenic material, the goals of introducing additives may be to optimize the eventual biochar for desired applications. For example, if the biochar is intended for soil remediation, then additives could be introduced into the refined/sorted biogenic material to maximize nitrogen and/or to reduce the concentration of undesirable chemistries such as sulfur and metals.

Preparation control engine 510 is also configured to control a drying process of the sorted biogenic materials along with any additives. In some embodiments, drying the material is essential for limiting oxygen during the later pyrolysis stage, but for all combustive reactions this is also desirable to drive efficiency (e.g., limit the energy needed to sustain the pyrolysis process that is required for converting the dried biogenic material into biochar). After additives are optionally added to the refined/sorted biogenic materials, the refined/sorted biogenic materials are dried. The main goal of drying the refined/sorted biogenic materials is to reduce the moisture level of the material and enable the biochar production to be more efficient. In some embodiments, drying the refined/sorted biogenic materials involves applying heat to the material. For example, the refined/sorted biogenic materials can be placed in an oven such as a drum dryer or a thermal belt dryer. In some embodiments, the length of time to dry the material for and the temperature at which to dry the material can be dynamically controlled by preparation control engine 510. For example, the moisture content of the refined/sorted biogenic materials can be determined by a moisture sensor/probe (e.g., after additives are added into the mixture) prior to drying the material. Then, the process parameters (e.g., temperature and length of time ("residence time")) at which to perform the drying can be determined based on that measured moisture content. In some embodiments, during the drying, a moisture sensor/probe can also be inserted into the material to determine whether the drying process should be stopped or extended. In some embodiments, preparation control engine 510 can allow the drying process to continue until the elapse of a determined length of time and/or until the measured moisture content is less than a determined threshold (e.g., less than 20%).

Pyrolysis control engine 512 is configured to control a pyrolysis process of the prepared biogenic mixture. The dried biogenic material is then converted into biochar (e.g., at the determined parameters), which is the result of burning organic material. Example techniques of producing biochar from dried biogenic material include pyrolysis, hydrothermal carbonization, gasification, flash carbonization, and torrefaction. In particular, pyrolysis may be performed in a rotary kiln, a screw auger, a vat/tank, or a thermal decomposition unit, and the process parameters of which are controlled by pyrolysis control engine 512. In some embodiments, prior to converting the dried biogenic material into biochar, the characteristics of the dried biogenic material may be analyzed to determine the material's composition. The characteristics of the dried biogenic material can be determined, for example, based on sorting and tracking engine 502's continuous tracking of materials that have sorted/added into the biogenic material stream as described above and the additive process as described above. Alternatively or in addition, the characteristics of the dried biogenic material can also be determined based on analyzing a sample of the material. Examples of such characteristics include the percentage of biogenic material and the percentage of non-biogenic material (e.g., that was not able to be removed during the prior separation and purification processes). The process parameters (e.g., temperature, length of time) of biochar production can be determined based on the determined weight/mass/volume, chemical composition characterization of the dried biogenic material, and a desired use case for the resulting biochar and/or syngas byproduct. For example, if the characteristics indicate that there is at least a threshold portion of non-biogenic material, the parameters of the pyrolysis can be updated (e.g., the default temperature values such as 450 C to 900 C degrees (and in particular, 600 C to 800 C) can be modified to lower temperatures and the default pyrolysis duration/residence time can be increased). Given that, generally, non-biogenic material (e.g., plastic) has higher boiling and melting points than biogenic material, when there is a presence of non-biogenic material within the material that is to be subject to pyrolysis, pyrolysis can be performed at a lower than default temperature and/or for a longer than default duration. The goal of the adjusted temperature and/or longer duration is to potentially convert only the biogenic portion of the pyrolyzed material into biochar while the remaining (e.g., non-biogenic) material, which will likely possess different physical attributes than the biochar, can be sifted/screened out from the output of the pyrolysis. The remaining non-screened out output (biochar) from pyrolysis can then be pulverized to a fine particulate for one or more applications.

In some embodiments, instead of tailoring the pyrolysis parameters to each batch of dried biogenic materials, a target set of pyrolysis parameters (e.g., a target temperature and a target duration) is used during an instance of pyrolysis and where the target set of pyrolysis parameters have been determined through historical instances of pyrolysis that have achieved the desired pyrolysis output. In a specific example, plastic bags, which are undesirable non-biogenic materials, burn at a higher temperature than desirable biogenic material such as paper and food. If pyrolysis of this combination of plastic bags and biogenic material were set to a lower temperature that burns only the biogenic material, then the plastic bag remains can be later sifted out of the pyrolysis output as a means of reducing the amount of undesirable contamination in the resulting biochar.

Reconfiguration engine 514 is configured to modify the configuration/behavior of one or more sorting facility devices to create or update the current tracked mixture/blend/formulation of materials that are sorted/captured and added to a bunker. In some embodiments, both programmatic and graphical interfaces (e.g., at user interface 516) can be provided by reconfiguration engine 514 to receive the selection of a new desired formulation case (e.g., selected from biomass mixture formulation storage 508). In some embodiments, each formulation stored in biomass mixture formulation storage 508 may specify the target metrics chemical composition of objects (e.g., a predetermined mix of materials/chemical composition, a desired level of moisture, a desired hydrogen to carbon ratio (e.g., <0.4), a desired total range of mass) and optionally, may also be associated with a particular use case (e.g., of the biochar or syngas that will be produced as a result of pyrolyzing the formulation of objects). Configuration data for other types of sorting devices may vary in content, but are generally similar. The configuration data is utilized by sorting and tracking engine 502 to set targets for ML vision subsystems as well as optimize sorting device (e.g., air jet) behavior for the desired type of objects to meet the desired formulation. A desired formulation may be input to sorting and tracking engine 502 via user interface 516, and sorting and tracking engine 502 in turn selects the appropriate configuration data for ML vision and sorting devices accordingly, enables the download of the configurations across the facility, and utilizes the auditing mechanisms described herein to monitor output (e.g., captured object) quality based on the input specification formulation. As mentioned above, sorting and tracking engine 502 is configured to determine the real-time, current metrics of sorted/captured objects that have been added to one or more bunkers. The current/actual metrics of objects that have actually been deposited into a bunker are then compared with the target metrics of the desired formulation to determine whether the difference between the two is greater than a threshold. If the difference between the current/actual metrics of the bunker and the target metrics exceeds the threshold, then at least some of the devices (e.g., sensors, processors, sorting devices, screens, shredders) of the sorting facility can be reconfigured by reconfiguration engine 514 to ensure that the remaining objects that are to be deposited into the bunker will cause the overall actual metrics of the bunker to be closer to the target metrics of the desired formulation. For example, if more yard waste were needed to be added to the sorted biogenic material, then reconfiguration engine 514 may cause the set of target object criteria to be updated to specify yard waste as target objects for sorting devices to fire on and for conveyor devices to transport such yard waste into the sorted biogenic mixture.

Reconfiguration engine 514 is also configured to cause preparation control engine 510 and pyrolysis control engine 512 to update the process parameters of the drying process and the pyrolysis process, respectively, based on the historical determined quality of generated biochar and/or syngas from the process of pyrolyzing sorted biogenic material. For example, the quality of the biochar and/or syngas from one or more historical pyrolyzing of sorted biogenic material is determined by analyzing a sample of the biochar/syngas and/or applying machine learning to sensed data (e.g., images) captured with respect to the biochar/syngas. If the quality does not meet the selected desired formulation and/or other target criteria, then reconfiguration engine 514 is configured to cause preparation control engine 510 and/or pyrolysis control engine 512 to update the drying and/or pyrolysis' process parameters in processing a subsequent batch of sorted biogenic material. Similarly, if the quality does not meet the selected desired formulation and/or other target criteria, then reconfiguration engine 514 is configured to cause sorting facility devices to update their configurations to result in different, improved updated biogenic materials to be sorted and serve as the basis for improved biochar to be produced.

Figure 6:
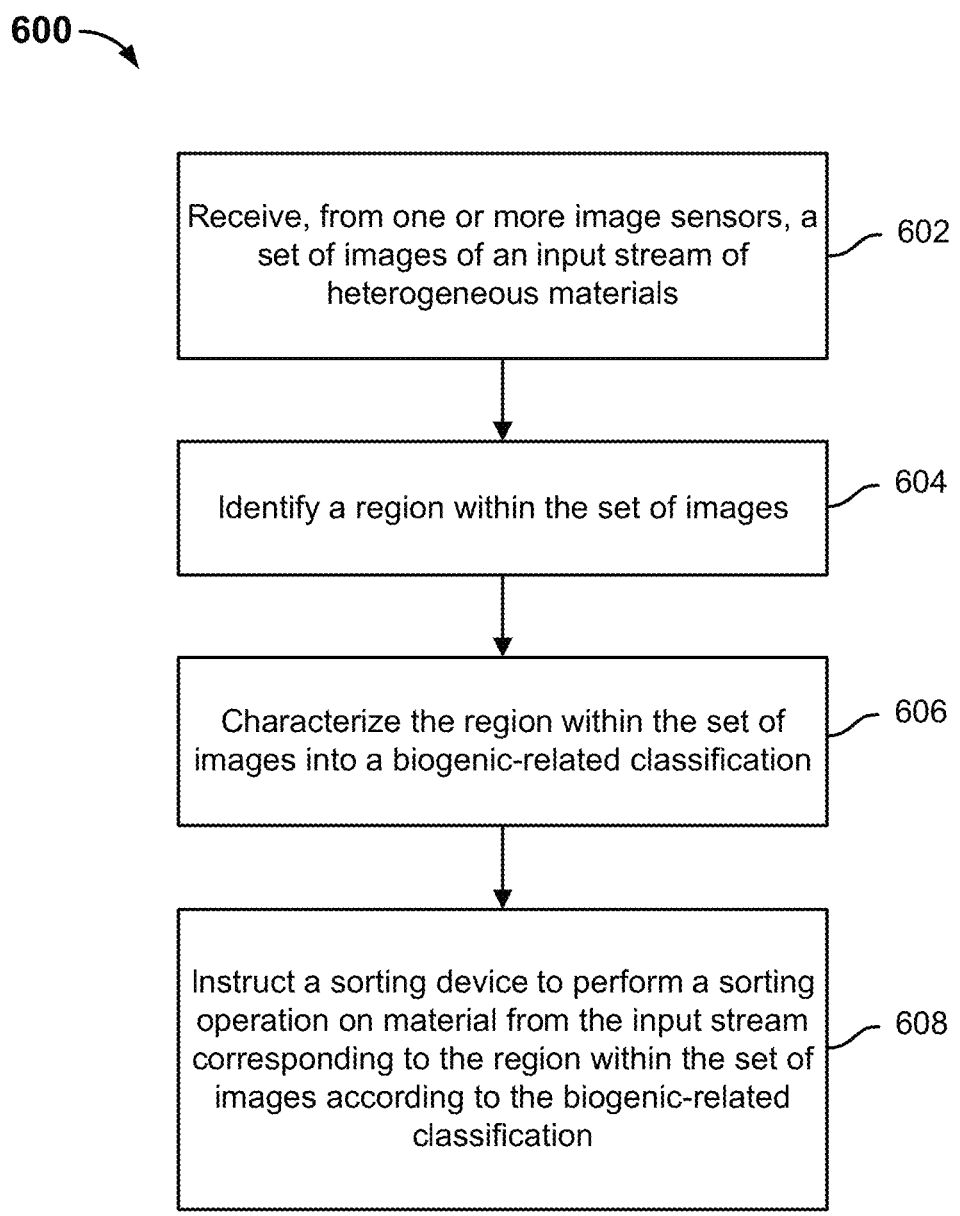
FIG. 6 is a flow diagram showing an embodiment of a process for sensing a biogenic material.

FIG. 6 is a flow diagram showing an embodiment of a process for sensing a biogenic material. In some embodiments, process 600 may be implemented at an MCS at a sorting facility such as MCS 416 of FIG. 4.

At 602, a set of images of an input stream of heterogeneous materials is received from one or more image sensors. The image(s) are obtained from image sensor(s) (e.g., vision sensor(s), camera(s) located in a sorting facility at which a stream of heterogeneous materials has been ingested and to be sorted into at least biogenic materials and other materials) (e.g., non-biogenic materials, commodities such as recyclables, and/or residue). In some embodiments, an image sensor is located above a conveyor device within the sorting facility and can therefore capture overhead images of the materials being conveyed. For example, the stream of heterogeneous materials comprises MSW. It is desirable to separate the biogenic material portion out from MSW so that the biogenic material can be further processed to prevent the release of GHG. For example, the sorted biogenic materials will be pyrolyzed and thus turned into biochar, which has many applications in industries such as agriculture and construction. In some embodiments, sensed data with respect to the input stream can also be obtained from non-image sensors (e.g., NIR, depth, moisture).

At 604, a region within the set of images is identified. In some embodiments, segmentation is performed on the image(s). Image segmentation partitions an image into segments or regions based on analyzing the pixel values of the image. Pixels within the same region are more similar to each other than pixels that have been assigned to neighboring/adjacent regions. Given that biogenic material within the input stream may be contiguous (e.g., lack separation between individual biogenic objects) and have non-discrete boundaries (e.g., due to clumping or decay of the organic matter), image segmentation is helpful to identify regions of similarly appearing pixels versus discrete boundaries around individual objects.

At 606, the region within the set of images is characterized by a biogenic-related classification. In some embodiments, machine learning is applied to assign a biogenic-related classification to each such region within the image. For example, the machine learning model can be trained using training data comprising segmented images and where segments/regions are annotated with the appropriate biogenic-related classification. This machine learning model can then be applied at the sorting facility to analyze the pixel values within each image segment/region to assign a corresponding biogenic-related classification to that region (e.g., as well as a corresponding confidence of the classification). Examples of biogenic-related classification include whether the region includes biogenic material at all, and if the region includes biogenic material, the classification may include a particular category of biomass such as food waste, yard waste, wood, paper, cartons, and cardboard. Additional examples of biogenic-related classification include relative classes of wetness (e.g., five classes of different degrees of wetness, which are determined as a function of coloring, reflectivity, and visible moisture). In some embodiments, each image region is analyzed and assigned a material classification, which may include both biogenic and non-biogenic classifications (e.g., plastic types, metal types, glass types).

In some embodiments, in addition to assigning a biogenic-related classification to each region of an image, instance segmentation is also performed on the image to identify individual objects (e.g., the outlines or masks of individual objects) in the object. Instance segmentation is helpful to identify the outline/location/shape of discrete objects (e.g., bottles, cans, plastic containers, and other non-biogenic materials) for sorting.

In some embodiments, non-image sensor data, such as sensor data from NIR, depth, and/or moisture sensors on the input stream can be used to supplement the assignment of biogenic-related classifications to regions of an image.

At 608, a sorting device is instructed to perform a sorting operation on material from the input stream corresponding to the region within the set of images according to the biogenic-related classification. In some embodiments, the biogenic-related classification of each image region (and potentially, non-image sensor data corresponding to the materials of the input stream) is compared against a set of target object criteria to determine whether there is a match. In some embodiments, the set of target object criteria, which describes which types of objects/materials that sorting device(s) should sort (e.g., harvest into bunkers or divert onto target conveyor devices), is reconfigurable. For example, the set of target object criteria is determined based on a desired formulation (e.g., a predetermined mix of materials/chemical composition, a desired level of moisture, a desired hydrogen to carbon ratio (e.g., <0.4), a desired total range of mass) of the mixture of biogenic materials to collect and, potentially, a tracked/detected actual composition of the mixture of biogenic materials that have been sorted (e.g., and collected at a particular container/bunker) so far at the facility. In the event that the assigned biogenic-related classification to the region of the image matches the current set of target object criteria (and given that sorting of the target object should not be suppressed in view of any neighboring non-target objects), then a sorting device that is downstream of the materials corresponding to the image region is instructed to sort those materials (e.g., and harvest the materials into bunkers or divert onto target conveyor devices).

In some embodiments, to instruct a selected downstream sorting device to sort the materials that correspond to the image region, the pixel boundary/location on the conveyor belt that defines the region is translated into another coordinate system, if any, that is used by the sorting device so that the sorting device can engage/direct force on the materials in that region when those materials are transported/conveyed to the pick/firing area of the sorting device. As will be described in further detail below, in some embodiments, when the selected downstream sorting device comprises a controllable array of air jets, the pixel boundary/location on the conveyor belt that corresponds to the image region is used to determine the width/section of air jets along the array that will be firing on the materials (e.g., in a time-vary manner) from a downcut configuration to ensure a high chance of successfully diverting the materials.

Figure 7A:
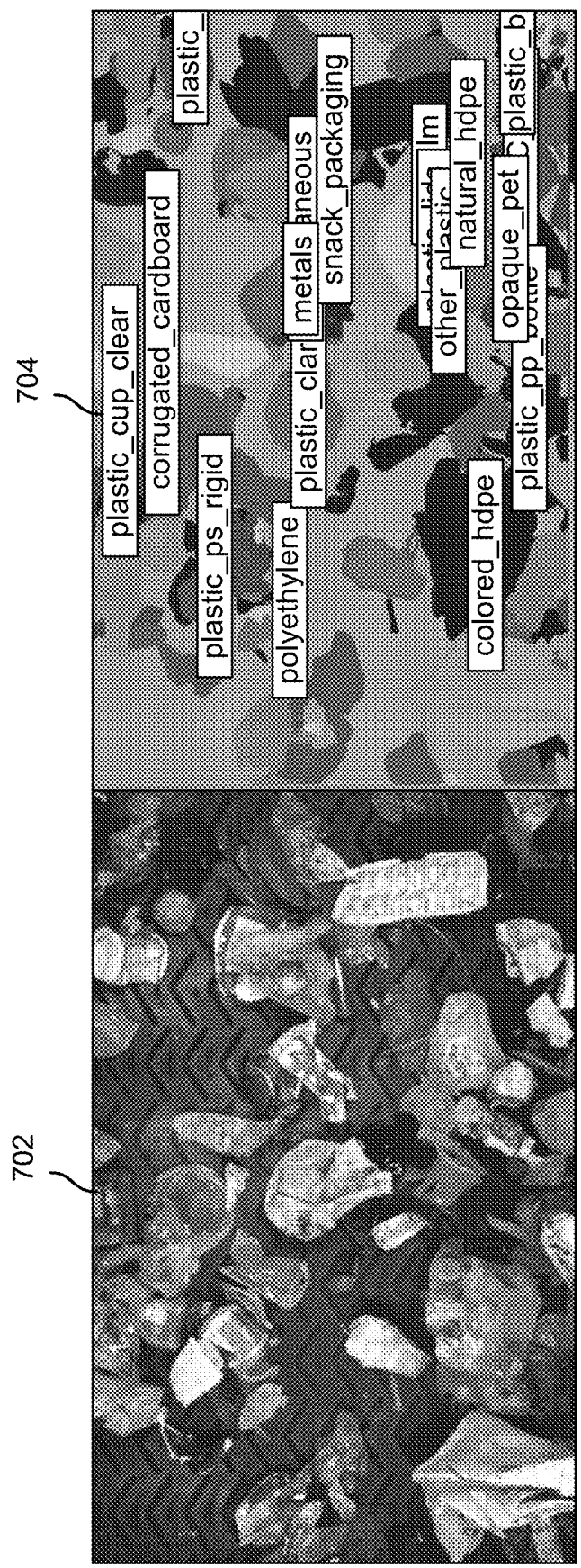
FIG. 7A is a diagram showing an example of image segmentation.

FIG. 7A is a diagram showing an example of image segmentation. Original image 702 comprises an overhead image of heterogeneous objects from an input stream that is being conveyed in a sorting facility. Original image 702 is subjected to image segmentation to partition the image into pixel regions, where neighboring pixels that are similar to each other are included in the same region. As described above (e.g., in process 600 of FIG. 6), each pixel region is then analyzed using machine learning and assigned a corresponding material classification that includes biogenic and non-biogenic related classifications. Segmentation map 704 shows the segmented version of original image 702 and where each segment/region is shown in a corresponding (grayscale) color and text label of its assigned material classification. As shown in segmentation map 704, each pixel region maps to the shape/dimensions/boundary of a piece or a cluster of objects/materials. Segmentation map 704 can be used by the MCS to determine segments/regions whose material classification matches target object criteria and are therefore candidates to be sorted by a downstream sorting device. For a segment/region whose material classification matches target object criteria, MCS can use the shape/dimensions/boundary of the segment/region in pixel space or a conversion thereof to a different coordinate system to instruct the sorting device (e.g., a controllable array of air jets) to fire on the material corresponding to that segment/region in a way that is informed by the shape/dimensions/boundary.

Figure 7B:
FIG. 7B is a diagram showing another example of image segmentation.

FIG. 7B is a diagram showing another example of image segmentation. Image 752 comprises an overhead image of heterogeneous objects from an input stream that is being conveyed in a sorting facility. Image 752 is subjected to image segmentation to partition the image into pixel regions, where neighboring pixels that are similar to each other are included in the same region. As described above (e.g., in process 600 of FIG. 6), each pixel region is then analyzed using machine learning and assigned a corresponding material classification that includes biogenic and non-biogenic related classifications. Each region's material classification is then compared to target object criteria. In the example of FIG. 7B, each segment/region that is assigned a material classification that matches target object criteria is shown with an annotated outline. As described above, the MCS can use the shape/dimensions/boundary of the segment/region in pixel space or a conversion thereof to a different coordinate system to instruct the sorting device (e.g., a controllable array of air jets) to fire on the material corresponding to that segment/region in a way that is informed by the shape/dimensions/boundary.

Figure 8:
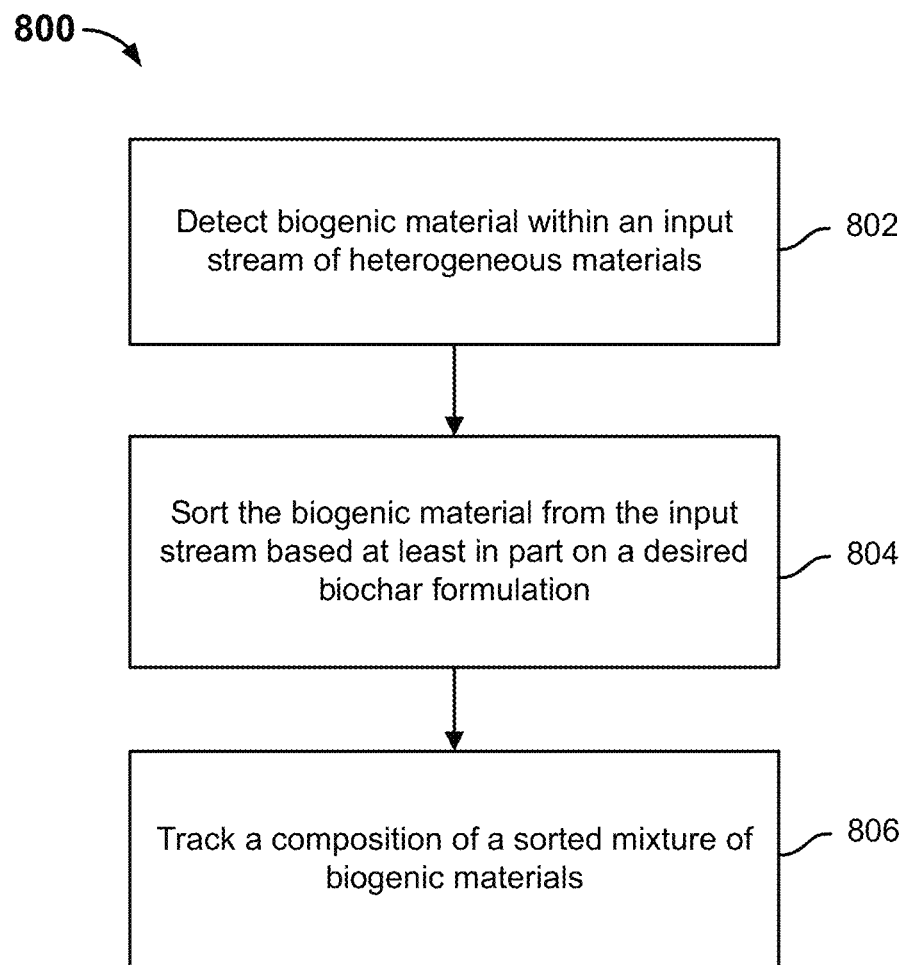
FIG. 8 is a flow diagram showing an embodiment of a process for sorting biogenic material based on a desired biochar formulation.

FIG. 8 is a flow diagram showing an embodiment of a process for sorting biogenic material based on a desired biochar formulation. In some embodiments, process 800 may be implemented at an MCS at a sorting facility such as MCS 416 of FIG. 4.

At 802, biogenic material is detected within an input stream of heterogeneous materials. The input stream of heterogeneous materials is ingested at a sorting facility. For example, the stream of heterogeneous materials comprises MSW. In some embodiments, the biogenic material is detected using sensed data obtained from one or more image sensors using a process such as process 600 of FIG. 6. In some embodiments, the biogenic material is detected using sensed data obtained from non-image sensors such as, for example, NIR sensors and moisture sensors.

At 804, the biogenic material from the input stream is sorted based at least in part on a desired biochar formulation. As mentioned above, a desired formulation can describe the composition and/or other attributes of a set of sorted biogenic material and/or a product (e.g., biochar or syngas) that is to be generated from the sorted biogenic material (e.g., through drying and/or subsequent pyrolysis). In some embodiments, a desired formulation corresponding to the type/application/use case of biochar (and/or also the syngas that is generated with the biochar) that is desired to be generated from sorted biogenic material can specify one or more of, but not limited to, the following parameters: the chemical composition (e.g., a relevant ratio or percentage of one or more chemical elements such as carbon, hydrogen, phosphate, potassium), the maximum limit of certain materials (e.g., volatile organic compounds (VOC), metal content, carbon content, plastic content, silica content, ash content, tar content, oxygen content, toxic content, sulfur oxide, nitric oxide, particulate matters, carbon dioxide, hydrogen sulfide), a porosity parameter, a desired pH, a desired range of mass, a desired range of moisture content, and a desired purity range. Example applications/use cases of biochar include cover and soil uses, concrete intermixing, asphalt intermixing, fuel for thermal processes, and filtration systems. In some embodiments, the desired biochar formulation can be mapped to a (n) (initial) set of target object criteria, which describes types/classifications of biogenic materials that should be sorted from an input stream to create a sorted mixture of biogenic materials that matches/meets the desired formulation. For example, the sensed data collected from one or more types of sensors (e.g., image, hyperspectral, NIR, moisture) that are placed throughout the sorting facility can be used to characterize the material types/classifications of the materials within the input stream. In some embodiments, the determined material type/classification of an object/set of materials is looked up in a reference library (e.g., a chemical database) to obtain the relevant secondary characteristics such as chemical compositions, proximate and ultimate characteristics (e.g., ash, sulfur, nitrogen, oxygen, etc.), composition item types/classes, depth, and/or moisture data. Then characterized objects/materials within the input stream that match the target object criteria are removed from the stream via sorting devices and ultimately conveyed to or deposited into bunker(s) that hold a sorted mixture of biogenic materials.

At 806, a composition of a sorted mixture of biogenic materials is tracked. As objects/materials from the input stream are sorted into the bunker/collection, the composition of the actually sorted objects in a set of bunkers/collections is tracked. In some embodiments, the composition of the actually sorted objects in a set of bunkers/collections can be tracked based on the determined instructions of which objects (and their respective attributes) to sort, auditing the sorting operations to determine which successfully led to harvested objects, and/or using sensor(s) to obtain data within the bunker(s)/collection(s) of successfully sorted objects. The composition of the actually sorted objects in a particular bunker/collection may include the collective chemical composition of the mixture as well as other content (e.g., VOC, ash, metal, plastic, the total mass, the overall purity) within/of the mixture.

Based on the tracking of the composition of the sorted mixture of biogenic materials, in some embodiments, the MCS may reconfigure the sorting parameters (e.g., target object criteria) for subsequent sortation of objects and/or in what amounts, as well as key process parameters across upstream and/or downstream of the sorting, such as shredder speed, shredder rotating pattern, screen speed, conveyor speed, drying temperature, drying residence time, pyrolysis temperature, pyrolysis residence time, mill sizing, and pressure associated with wind density separation devices, for example. In particular, as biogenic material becomes sorted from the input stream, the tracked composition of the sorted biogenic material is compared to the desired formulation. When a discrepancy along one or more aspects (e.g., a chemical composition, VOC content, moisture content, etc.) is determined between the tracked composition of the sorted biogenic material and the desired formulation, the MCS can reconfigure the target object criteria for subsequent sortation of objects such that the combination of subsequently sorted materials with the already sorted materials would yield a composition closer to the desired formulation. Also, in response to such a determined discrepancy along one or more aspects between the tracked composition of the sorted biogenic material and the desired formulation, the MCS can reconfigure the process parameters of sorting facility equipment that may be applied to the stream of materials upstream of sorting of biogenic materials such as, for example, shredder speed and rotating pattern, screen speed, conveyor speed, mill sizing, and pressure associated with wind density separation devices, to affect the preprocessing of the stream of materials leading up to the sorting of biogenic materials such that the combination of subsequently sorted materials with the already sorted materials would yield a composition closer to the desired formulation. Moreover, in response to such a determined discrepancy along one or more aspects between the tracked composition of the sorted biogenic material and the desired formulation, the MCS can reconfigure the process parameters of the drying and/or pyrolysis systems that will turn the sorted mixture of biogenic materials (e.g., after the sorting stage) into biochar. Examples of the drying and/or pyrolysis process parameters that can be reconfigured by the MCS to cause the sorted mixture of biogenic materials to be processed into the biochar (e.g., use case/application/type) that is intended by the desired biochar formulation include one or more of: drying temperature, drying residence time, pyrolysis temperature, and pyrolysis residence time. In some embodiments, the MCS can conduct this process using stochastic process optimization to optimize sorting and/or process parameters against a feedstock and enable further control of the distribution of outcomes associated with a variable feedstock and process. For example, the initial set of target object criteria may describe objects/materials that belong to a biogenic classification and are associated with low moisture content. However, as the current moisture content of the sorted biogenic material is determined to be higher than what is specified in the desired formulation, the target object criteria for subsequent sortation of objects may be reconfigured to target objects with low moisture content (e.g., up to a specified total mass).

As such, the sorting devices and process flow designs provide a spectrum of control over the available material, all of which can be coordinated against a specification by the MCS to regulate and balance for key constituent components of the target use case of produced biochar. The MCS can interpret and respond to input stream variability through continuous control of process parameters including but not limited to nuanced parameters in the targeting and harvesting algorithms of the control system and its sorting devices.

The following sections describe embodiments of applying a process such as process 800 of FIG. 8 in a number of example applications/use cases related to the production of biochar. The application of this technology can enable targeting of desirable characteristics across a range of properties, including, but not limited to one or more of the following: volatile organic compound (VOCs), Cation Exchange Capacity, Nutrient contents (NPK), ash contents, carbon content, pH, surface area, porosity, and formulation with non-biochar feedstocks such as inerts, silica, and plastics.

Biochar for Cover & Soil Use Cases: In some embodiments, one or more process flow designs can be configured to produce a biochar for the application of a land cover such as alternative daily cover and immediate cover for landfills. The sorting facility described can be configured and optimized via the MCS for the purposes of formulating and controlling the biochar feedstock (the sorted mixture of biogenic materials from which biochar is to be produced) to achieve optimal cover design for a variety of cover applications, including, but not limited to: road construction (subgrade stabilization and base layering), construction fill (foundation fill and grading), levee and embankment construction (embankment fill and erosion control), land reclamation, and even soil amendments for berms, mulching, and other primary soil amendments.

In the landfill cover embodiment specifically, as well as in other soil-like fill embodiments, the sorting facility can regulate to optimize nitrogen/phosphate/potassium (NPK), VOC content, heavy metal content, carbon content, and plastic and silica inclusion rates in the biochar feedstock. This can be done to optimize for moisture and ensure a healthy, non-methanogenic biochar for intermixing into soil. In some embodiments, the MCS targets specific material types (e.g., paper, plastics, biogenics, etc.) based on a chemical database of known properties and adjusts the biochar feedstock mix to meet globally specified parameters. In some embodiments, sensors measure feedstock chemical composition (e.g., for moisture, nitrogen, metals) and the feedback from these is used by the master control system to dynamically adjust the feedstock mix.

In the landfill cover application, this material can be intermixed with soil at optimal moisture, porosity, and sizing characteristics for subsequent methanotroph cultivation or inoculation, resulting in a highly methane oxidative and nutrient rich cover for odor control, plant growth, and abated methane emissions of up to 99.96%. The MCS and integrated process allows for regulation of system parameters and biochar feedstock formulation to achieve a consistent and high-quality result against a harsh and variable input stream of heterogeneous materials. Primary heuristics for MCS optimization may include maximizing surface area and porosity, pH balancing (including ash balancing to avoid acidity), and carbon content, to create a strong odor capturing product with conditions conducive to high methanotroph population density and gas capture, driving efficient methane oxidation, for example. It may further include dynamic upregulation of temperature against measured output characteristics of the biochar via an object sensor (e.g., a vision/camera system, with or without additional sensing modalities such as NIR and Prompt Gamma Neutron Activation Analysis (PGNAA)), for the purposes of simultaneously minimizing ash content while maximizing hydrophobic characteristics of the biochar, sufficient for more effective polyfluoroalkyl substances (PFAS) binding and remediation, with a more controlled surface chemistry (avoiding excessive hydrophilicity). Alternatively, the temperature may be down-regulated for land-use applications that benefit from higher nutrient contents. Similarly, the process can be tuned to formulate higher inert contents or other feedstock characteristics that give it more desirable permeability or strength characteristics for construction fill or road related use cases.

Biochar for cementitious and asphalt materials: In some embodiments, the same principles and use of the MCS, integrated process flow design, sensors (e.g., vision/camera sensors and hyperspectral sensors, among others), and sorting devices can be applied to controlling for optimal production of biochar as a supplementary cementitious material (SCM). This may be optimized and dynamically controlled for the purposes of SCM inclusion in a standard concrete product such as Portland Type II Concrete (OTP), or asphalt materials that need similar intermix materials, for example. These embodiments enable carbon content optimization and control for a high-durability sequestration technique for the carbon within the biomass, as well as for offsetting carbon intensive cement use. These embodiments can help control for optimal biochar characteristics for concrete use cases, balancing porosity (and permeability) with other characteristics such as binding efficiency due to formulated aggregates and inerts common in the biochar feedstock, such as silica, or due to excess ash content, which can be controlled by process regulation against temperature points and compositional characteristics of the input stream of heterogeneous materials. In this process, the MCS may be configured to optimize uniform particle distribution, limited ash content for binding efficiency, minimal VOCs to avoid gas pocketing, and lower porosity to minimize water entry (unless by design), for example. The combination of these heuristics can be managed by the MCS utilizing the sensors, sorting devices, and integrated process flow design to establish optimal process parameters in real-time against a variable input stream to ultimately maximize compressive strength contribution and binding efficiency within the overall concrete, achieving a high-quality product from an abundant and otherwise inaccessible feedstock source (e.g., MSW).

While process 800 of FIG. 8 described sorting biogenic material based on a desired formulation corresponding to a biochar type/application/use case, the same process can also be applied to obtain a sorted mixture of biogenic materials based on a desired formulation corresponding to a syngas type/application/use case (where the syngas is produced as a byproduct of pyrolyzing the biogenic material into biochar).

The following sections describe embodiments of applying a process such as process 800 of FIG. 8 in a number of example applications/use cases related to the production of syngas. The application of this technology enables the targeting of desirable characteristics across a range of properties, including syngas composition, Calorific or Heating Value, purity, tar content, oxygen content, and toxicity. The composition of target gases may comprise largely of Hydrogen (H2: 10-25%), Carbon Monoxide (CO: 20-40%), Carbon Dioxide (CO2: 10-35%), Methane (CH4: 10-20%), and <5% mixed gasses such as Ethylene, Acetylene, and Hydrogen sulfide (H2S).

Syngas use for onsite heat and power: In some embodiments, the syngas produced on-site at the sorting facility may be optimized for its use in combined heat and power (CHP) production on-site. One example use of the syngas provided heat is in the drying of sorted biogenic materials prior to pyrolysis. These embodiments maximize energy efficiency by utilizing the total available calorific value in the syngas, by driving energy production using the full gas, for example, into a boiler or steam-turbine driven process, or a more conventional Organic Rankine Cycle. These embodiments require less energy intensity due to lack of syngas refinement, and have distinct attributes for which the MCS might optimize. Given on-site combustion, the MCS can control process parameters and feedstock characteristics to minimize ultimate NOx, SOx, VOC, PM10, PM2.5, H2S, CO, or Ammonia levels, by driving tighter control profiles on materials such as gypsum, or dynamics such as oxidation of certain materials within the pyrolysis process (e.g., via temperature regulation). These embodiments may have further synergies with unique development models that take advantage of the full capabilities of such a sorting and processing paradigm, such as utilizing the excess heat and energy, as well as the biochar described in detail above, for the purposes of formulating, optimizing, and ultimately producing low-carbon concrete on-premises.

Syngas use as a biofuel intermediate: In some embodiments, the syngas produced on-site may be optimized for its subsequent use in a biofuels production process, such as, for example, in renewable natural gas production (RNG), methanol, hydrogen, ethanol, or Fischer-Tropsch to sustainable aviation fuel (SAF). In such embodiments, the sorting facility as described herein may vary input stream characteristics such as maximizing hemicellulosic or lignocellulosic materials for sortation, or process drying and/or pyrolysis parameters such as composition of feedstock, elemental control, temperatures, and residence times. Higher temperatures (800° C.-1000° C.) favor the production of hydrogen by breaking down hydrocarbons and promoting endothermic reactions like the water-gas shift, which accelerates tar usable for bio-oil sequestration. Residence times (e.g., in the dryer for drying sorted biogenic material and/or in a system for performing pyrolysis) may be up- or down-regulated to drive methane production or accelerated breakdown of organics for hydrogen, a factor that can be regulated by the MCS to ensure maximum fuel outputs. In some embodiments, the MCS establishes a proportional-integral-derivative (PID) control loop around a gas chromatography sensor at the intermediate and final stages to control process characteristics such as drying time, feedstock composition, pyrolysis temperature, and residence time. In this closed-loop, vision-aided and machine-learning process, the components of the sorting facility may be tuned to maximize yields, economic values, and/or carbon efficiency. These components of the sorting facility are coordinated intelligently by the described MCS to regulate intermediate characteristics such as balancing CO, CO2, H2, CH4, and other elemental properties, for example, as well as modifying process stages to maximize outputs in subsequent processes like Fischer-Tropsch for SAF, or biomethanation control characteristics for RNG. These characteristics can be stochastically optimized using the MCS. As mentioned in detail herein, the sorted mixture of biogenic materials can be continuously monitored, and formulated for elemental balancing into the process, while being married with MCS-controlled characteristics. Further, the process may be optimized for signals related to ASTM certification and ultimate quality. The oil, char, and tar ratios can be balanced as described above to maximize carbon commodity co-processing and ultimate use cases based on market conditions and regional offtakers for accessible carbon treatments. Examples of these include injection, biochar, and olefin-pyrolysis up-processing to synthetic oil for combustion (e.g., steel manufacturing) and plastics. It can further be used to identify safety issues in intermediate and final steps to separate out undesirable batches and adhere to United States Department of Agriculture (USDA), Environment Protection Agency (EPA), and ASTM regulatory and certifying requirements. By this same process, it can predict gas yields and maintenance needs.

Pelletization of feedstock for Sustainable Residue Fuels: In some embodiments, the same principles are applied to the production of pelletized or briquetted Sustainable Residue Derived Fuels (SRF or RDF). This involves dosing and formulating composition of the sorted mixture of biogenic materials to control for moisture and plastics to regulate temperature for optimal heating in downstream manufacturing kilns for materials such as concrete, cement, and steel.

Figure 9:
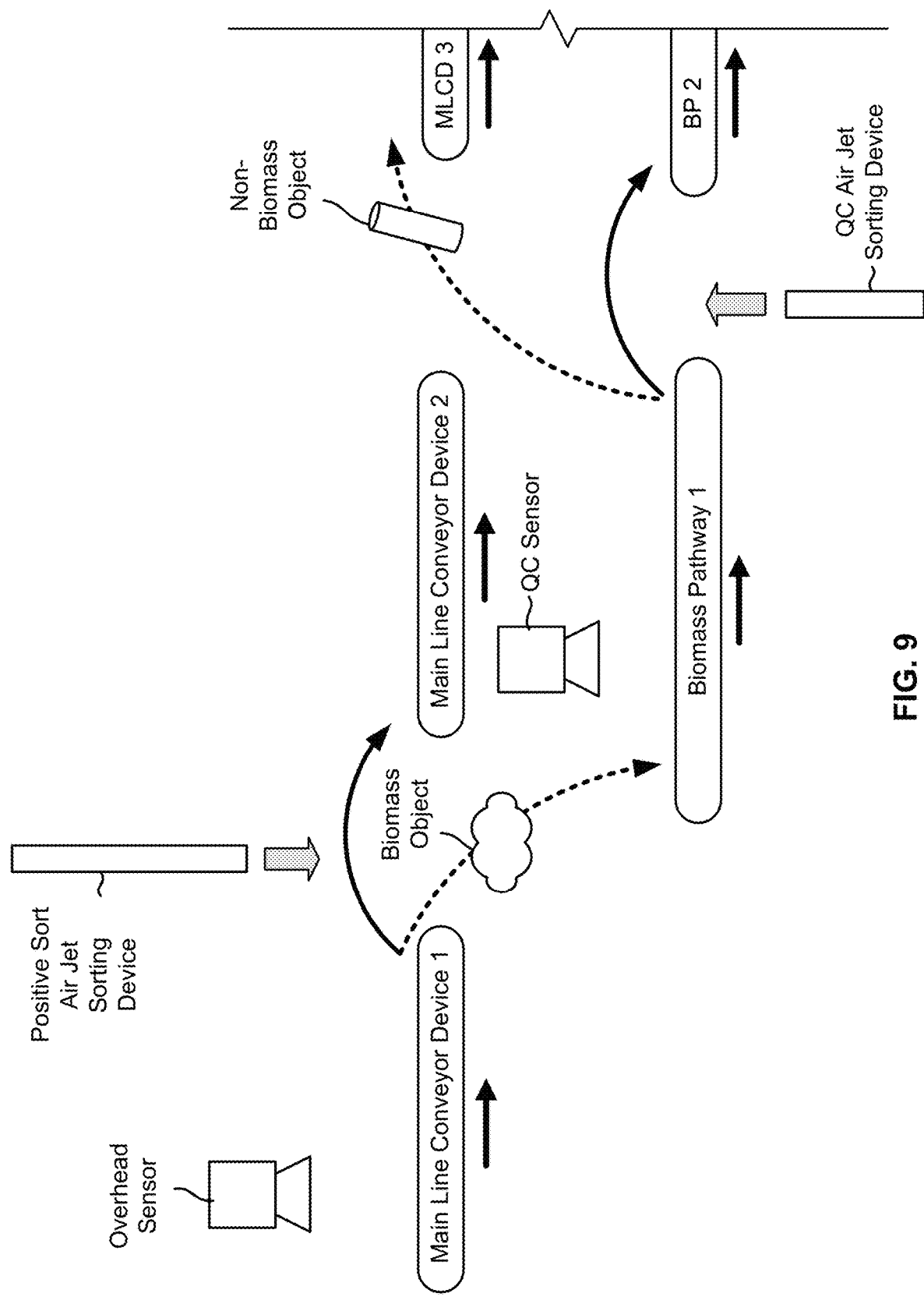
FIG. 9 is a diagram showing an example of configurations of a positive sort sorting device, a quality control sorting device, and image sensors that can be used to enable detection of biogenic materials and quality control on sorted materials.

FIG. 9 is a diagram showing an example of configurations of a positive sort sorting device, a quality control sorting device, and image sensors that can be used to enable detection of biogenic materials and quality control on sorted materials. Specifically, FIG. 9 shows the side view of a first controllable array of an air jets sorting device (Positive Sort Air Jet Sorting Device) that is configured to perform positive sorting on targeted biogenic material, the side view of various conveyor devices (Main Line Conveyor Device 1, Main Line Conveyor Device 2, and Main Line Conveyor Device 3 ("MLCD 3")) along the main sorting line of a sorting facility, the side view of two conveyor devices (Biomass Pathway 1 and Biomass Pathway 2 ("BP 2")) along a target pathway designated for transporting biogenic materials that have been diverted from the main sorting line, the side view of various image sensors (Overhead Sensor and QC Sensor) that can be used to capture images of objects along the main sorting line and the pathway designated for transporting biogenic materials, and a second controllable array of air jets sorting device (Quality Control (QC) Air Jet Sorting Device) that is configured to perform positive sorting on targeted biogenic material. In some embodiments, the configuration of sorting facility devices that are shown in FIG. 9 can be implemented within sorting facility 400 that was described in FIG. 4.

One or more of the sorting devices within a sorting facility can be controllable air jet arrays. In various embodiments, an "air jet" array type of sorting device (or sometimes referred to simply as "air jet") comprises an array of air valves or air orifices that are each controlled to emit/fire pressurized airflow on a target object to change the trajectory of the object towards a desired destination. For example, an air jet array can be instructed (e.g., by an MCS) to perform a sorting operation by activating one or more of the air valves to fire airflows on a target object as it passes across the array. In some embodiments, an air jet array is distributed across the width of a conveyor belt (e.g., at the end of the belt from which objects fall off), with its air jets aimed to selectively fire on a target type of material in the direction of a collection bunker or another conveyor belt that will transport the material towards the bunker. Returning to FIG. 9, the diagram shows a downcut configuration in which a Positive Sort Air Jet Sorting Device's firing actions propel target objects (Biomass Object) that fall off a first conveyor belt (Main Line Conveyor Device 1) in a vertically lower direction, ending up on a lower conveyor belt (Biomass Pathway 1) that is configured to transport sorted biogenic objects towards a corresponding bunker, while non-sorted (non-target/non-biogenic) objects land on a second conveyor belt (Main Line Conveyor Device 2) at the same level as the first conveyor belt to be potentially sorted downstream. As mentioned above, it is beneficial to use an air jet sorting device in a downcut configuration (e.g., the direction of airflow is towards the ground/in a vertically lower direction) when sorting biogenic materials so that pieces of the biogenic material will likely not land/drop onto the air jet sorting device and potentially clog up an air jet/nozzle/valve.

Specifically, in FIG. 9, Overhead Sensor 1 captured an overhead image of objects such as Biomass Object on Conveyor Device 1. The MCS then applied machine learning model(s) to the overhead image to determine whether the attributes (e.g., material type, object type) of Biomass Object match the current target object parameters associated with Positive Sort Air Jet Sorting Device. Given that the attributes of Biomass Object matched the current target object parameters of Positive Sort Air Jet Sorting Device, the MCS had instructed Positive Sort Air Jet Sorting Device to fire on Biomass Object as it fell off Conveyor Device 1 to cause Biomass Object to drop down to Biomass Pathway 1, which is configured to convey diverted/sorted biogenic material towards a bunker. Had the attributes of Biomass Object not matched the current target object parameters of Positive Sort Air Jet Sorting Device, the MCS would not have instructed Positive Sort Air Jet Sorting Device to fire on Biomass Object and it would have fallen off Main Line Conveyor Device 1 and then landed on Main Line Conveyor Device 2.

As shown in FIG. 9, whether the objects that were fired upon by Positive Sort Air Jet Sorting Device and diverted onto the biomass pathway that is designated for conveying biogenic materials in fact match the target object criteria can be double checked or quality controlled using QC Sensor and QC Air Jet Sorting Device. Quality control is needed to remove contaminants (e.g., non-biogenic materials) that were (inadvertently) diverted onto the biomass designated pathway (e.g., as Positive Sort Air Jet Sorting Device was firing on a biogenic object). Referring to FIG. 9, assume that Non-Biomass Object had already been diverted by Positive Sort Air Jet Sorting Device onto the biomass pathway. QC Sensor captured an image of Non-Biomass Object as the object passed beneath it. The MCS then applied machine learning model(s) to the QC Sensor's image and then determined that the attributes (e.g., material type, object type) of Non-Biomass Object matched the current target object criteria associated with Positive Sort Air Jet Sorting Device. Given that the attributes of Non-Biomass Object did not match the current target object criteria of Positive Sort Air Jet Sorting Device, the MCS had instructed QC Air Jet Sorting Device to fire on Non-Biomass Object as it fell off Biomass Pathway 1 to cause Non-Biomass Object to be lifted up back onto a next conveyor device in the main sorting line, Main Sorting Line Conveyor 3 (MLCD 3), which is configured to lead objects to further instances of sensors and sorting device(s). In another example, Non-Biomass Object may be fired on by QC Air Jet Sorting Device to land in a residue container/conveyor instead of being returned to the main sorting line. Because in the example of FIG. 9, the designed biomass pathway is located vertically lower than the main sorting line, the QC Air Jet Sorting Device was configured/arranged to fire on Non-Biomass Object in an upcut configuration to return the object back onto the main sorting line for further opportunities of being harvested (e.g., into corresponding material type pathways or bunkers). Had the attributes of Non-Biomass Object matched the current target object criteria of Positive Sort Air Jet Sorting Device, the MCS would not have instructed the QC Air Jet Sorting Device to fire on Non-Biomass Object and it would have fallen off Biomass Pathway 1 and then landed on Biomass Pathway 2 for subsequent processing or towards a biogenic material bunker.

Figure 10:
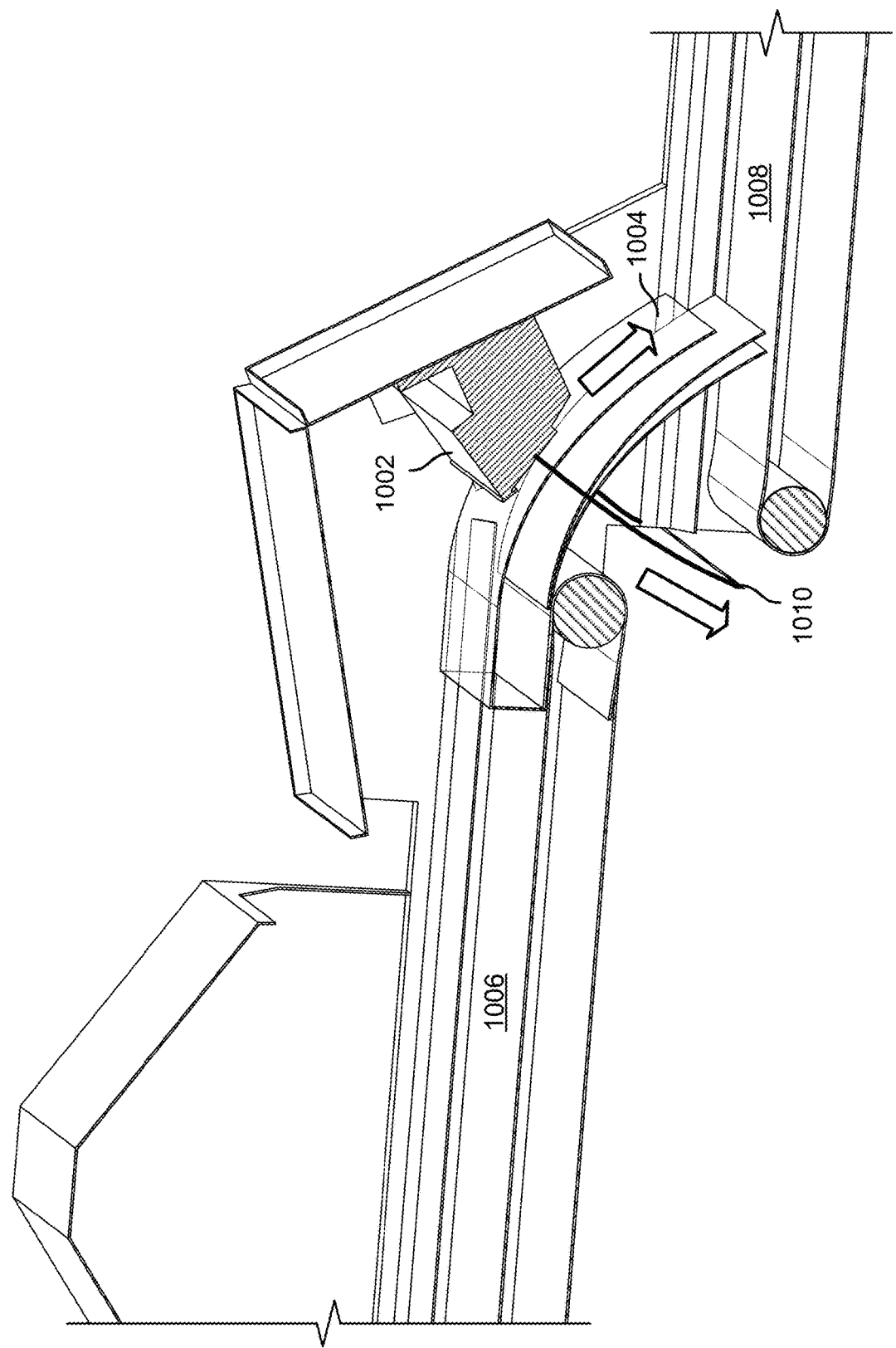
FIG. 10 is a diagram showing a cross-section view of two conveyor devices and an air jet sorting device arranged in a downcut configuration in a sorting facility.

FIG. 10 is a diagram showing a cross-section view of two conveyor devices and an air jet sorting device arranged in a downcut configuration in a sorting facility. In some embodiments, the configuration of sorting facility devices that are shown in FIG. 10 can be implemented within sorting facility 400 that was described in FIG. 4. In FIG. 10, a stream of materials (not shown) would be conveyed by conveyor device 1006 towards air jet sorting device 1002. A target object (that may be detected using techniques described above) within the stream can be sorted by air jet sorting device 1002 firing a downcut stream of air 1010 on the object after it falls off one end of conveyor device 1006 so that the object falls (in direction 1004) through the gap/junction between the adjacent conveyor devices and lands on a surface or in a bunker (not shown). A non-target object (that may be determined using techniques described above) may be ignored by air jet sorting device 1002, which will omit firing downcut stream of air 1010 on such a non-target object and as such, it will fall off one end of conveyor device 1006 and land on the next conveyor device in the series, conveyor device 1008. As mentioned above, the downcut configuration of firing a stream of air on target objects significantly reduces the risk that portions of the sorted object will break apart and clog the air jets of the air jet sorting device.

Figure 11:
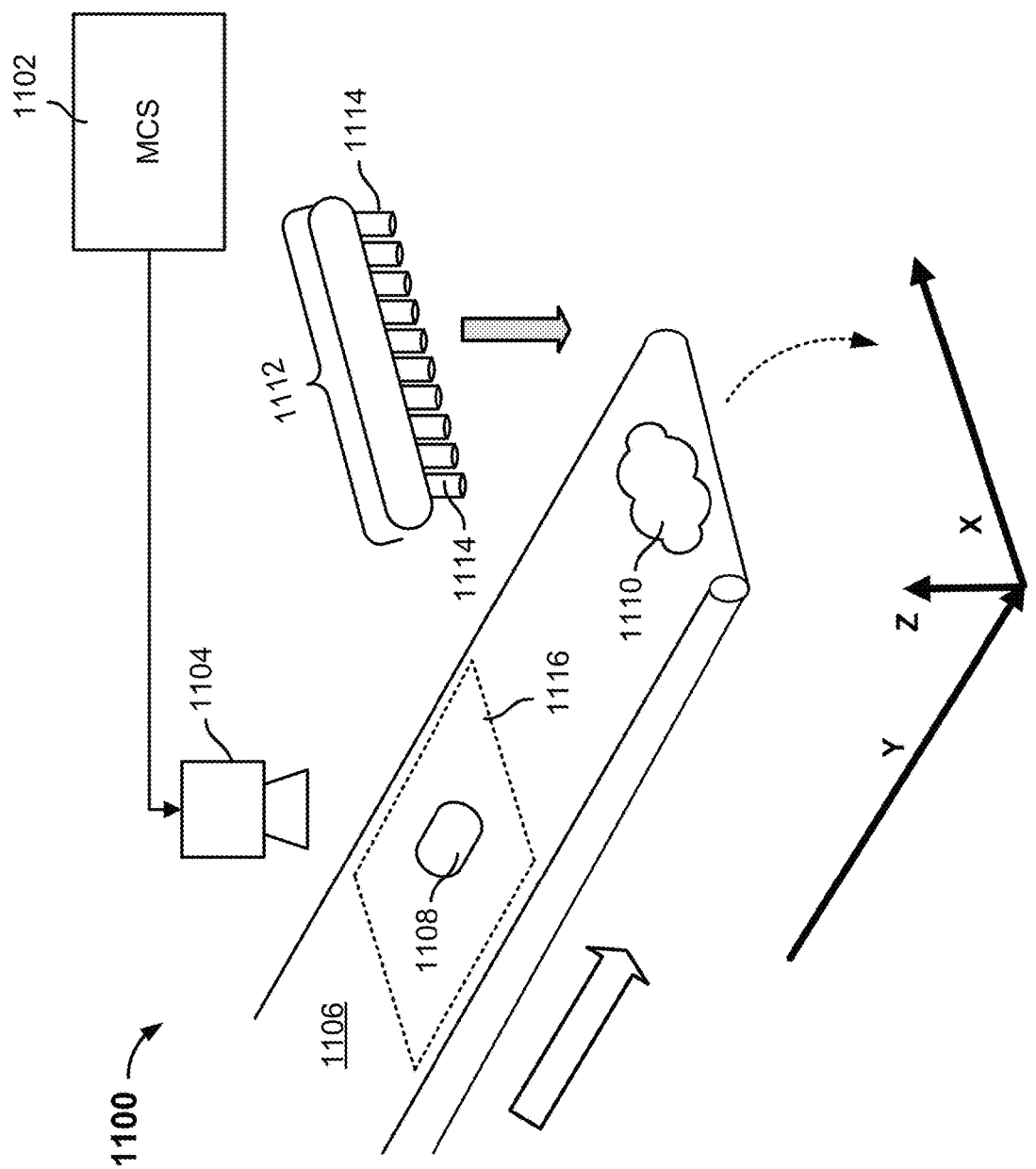
FIG. 11 is a diagram showing an example of a sorting system that uses time-varying control of a controllable air stream.

FIG. 11 is a diagram showing an example of a sorting system that uses time-varying control of a controllable air stream. Sorting system 1100 includes conveyor device 1106 that is configured to convey a material stream, including objects 1108 and 1110, through a portion of a sorting facility. For example, the sorting facility may be configured to sort through a heterogeneous stream of waste materials to capture desirable objects (e.g., biogenic materials) that can be used for additional processing (e.g., pyrolyzed into biochar and/or syngas). As the objects (e.g., objects 1108 and 1110) are conveyed in the Y-direction by conveyor device 1106 and before the objects fall off the end of conveyor device 1106, sensor 1104 is configured to capture an image of the objects on conveyor device 1106. As shown in FIG. 11, sensor 1104 is configured to (e.g., periodically) capture images of objects within its field of view 1116 across conveyor device 1106. In some embodiments, sensor 1104 is an optical/vision sensor (e.g., a camera). The image captured by sensor 1104 is sent (e.g., over a network (not shown) or over a wired connection) to management control system (MCS) 1102.

MCS 1102 is configured to compare each object's set of attributes (e.g., as detected using sensor data from sensor 1104) to a configurable set of target object criteria and determine that an object that matches the target object criteria is a "target object" upon which a sorting device such as air jet array sorting device 1112 (a controllable array of air jets sorting device) is to be instructed to perform a sorting operation.

In some embodiments, MCS 1102 is configured to determine a firing polygon that is to be executed by air jet array sorting device 1112 to a given target object. In various embodiments, an air jet array sorting device such as air jet array sorting device 1112 comprises an array of (e.g., 83) air jets 1114 (e.g., air valves) that can be controlled to emit a controllable stream of air at a target object to propel the target object towards a desired destination (e.g., a target conveyor device or a bunker) as the target object falls off the end of conveyor device 1106. In the example of FIG. 11, air jet array sorting device 1112 is shown in a downcut configuration and is therefore configured to shoot air on target objects downwards along the Y-direction. The air stream that can be emitted by air jet array sorting device 1112 is dynamically adjustable in air pressure and width, for example, as a function of time. In the example of FIG. 11, air jet array sorting device 1112 comprises a linear array of air jets arranged (e.g., along the X-direction) across the width of conveyor device 1106 and is located at the end of the conveyor belt in the direction of the belt's movement. In some embodiments, the X-direction crosses the Y-direction without necessarily being perpendicular to the Y-direction. In some embodiments, the X-direction intersects the Y-direction at a right angle. MCS 1102 is configured to dynamically determine a "firing polygon" to use to shoot air on the target object. In some embodiments, the firing polygon defines at each of a series of points in time, which and how many air jets (e.g., a specified width) should fire (be activated to shoot positive airflow) and, optionally, at a specified air pressure. Put another way, the "firing polygon" corresponds to a 2D (across a plane in the X and Y directions) shape of air to be emitted by air jet array sorting device 1112 over a period of time. An advantage of the 2D shape of air to be emitted by air jet array sorting device 1112 over time is that it is a time-varying stream of air applied along a surface/dimension of a target object to ensure that appropriate force is directed at appropriate locations of the object to successfully guide the object towards a desired direction. MCS 1102 is configured to determine the firing polygon of the selected airflow profile using the classification of the target object, the shape/dimensions/boundary/location of the target object or the image segment/region in pixel space that includes the target object or a conversion thereof to a different coordinate system. As such, the firing polygon will be located along the width of conveyor device 1106 (e.g., along the X-direction) to match the detected location (e.g., along the X-direction) of the target object. In some embodiments, the firing polygon can be scaled up (e.g., the number of air jets to activate at each time is increased) to accommodate a larger 2D area/projection of the target object on the conveyor belt or scaled down (e.g., the number of air jets to activate at each time is decreased) to accommodate a smaller 2D area/projection of the target object on the conveyor belt based on the detected dimensions, shape, and/or size of the target object. In some embodiments, the firing polygon can be partially suppressed (e.g., one or more air jets are no longer activated at one or more points in time, which effectively modifies the 2D shape of the air stream) due to the proximity of an undesirable neighboring object. In some embodiments, MCS 1102 is configured to send the firing polygon to air jet array sorting device 1112 so that air jet array sorting device 1112 can execute the instructed sorting operation on the target object based on the firing polygon.

Figure 12:
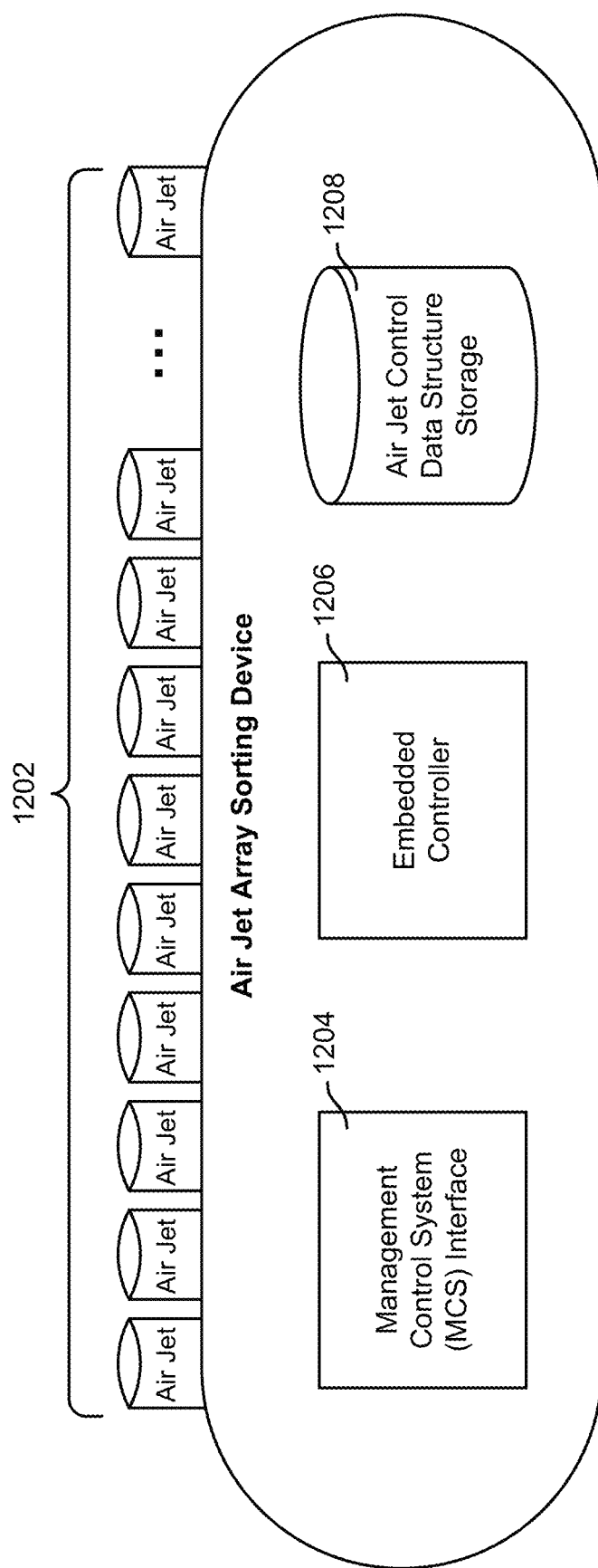
FIG. 12 is a diagram showing an example of an air jet array sorting device in accordance with some embodiments.

FIG. 12 is a diagram showing an example of an air jet array sorting device in accordance with some embodiments. In some embodiments, Positive Sort Air Jet Sorting Device of FIG. 9, air jet sorting device 1002 of FIG. 10, and/or air jet array sorting device 1112 of FIG. 11 may be implemented, at least in part, using the example air jet array sorting device described in FIG. 12. As shown in FIG. 12, the example air jet array sorting device includes air jet array 1202, management control system (MCS) interface 1204, embedded controller 1206, and air jet control data structure storage 1208. Each of management control system (MCS) interface 1204, embedded controller 1206, and air jet control data structure storage 1208 may be implemented using hardware and/or software.

Each air jet of air jet array 1202 is an air valve/nozzle ("air jet") that is coupled to a pressurized air source (not shown). For example, air jet array 1202 may include 83 air jets. Each air jet of air jet array 1202 may be independently controlled by embedded controller 1206, as will be described below, to emit positive airflow (e.g., at either a fixed pressure or a variable pressure) at a certain point in time. Put another way, at a given point in time, a given subset of contiguous or non-contiguous air jets in air jet array 1202 can be activated via jet commands from embedded controller 1206 to fire positive airflow and where the air pressure and firing duration that is emitted by each fired air jet can be controlled by embedded controller 1206.

MCS 1204 is configured to receive control signals/instructions from an MCS (e.g., such as MCS 416 of FIG. 4 or the example MCS described in FIG. 5). In some embodiments, the control signals/instructions that are received from the MCS include control signals/instructions related to performing a sorting operation on a target object that is to translate across the controllable air stream target region of the air jet array sorting device. In some embodiments, such control signals/instructions include a firing polygon and the estimated start and/or end times corresponding to a target object. In some embodiments, such control signals/instructions also include (e.g., a time-series of) air jet commands that are specific/compatible with the recipient's particular air jet array sorting device.

Embedded controller 1206 is configured to activate the air jets of air jet array 1202 to perform a sorting operation on a target object based on control signals/instructions received from the MCS that are received at MCS interface 1204. In some embodiments, embedded controller 1206 may be implemented by one or more controllers. Embedded controller 1206 may run an embedded operating system (e.g., embedded Linux, or other real-time operating system), or may not require a traditional operating system. In response to receiving control signals from the MCS via a network (e.g., WiFi, Ethernet), embedded controller 1206 is configured to generate the instructions necessary to control air jet array 1202, associated LEDs, if any, or other proprietary devices in the system (e.g., an actuator). In some embodiments, the controller software implements one or more wireline or wireless protocols that are compatible with the controlled devices (e.g., the air jet array). In some embodiments, the control signals received from the MCS may already include a data structure that includes a time series of air jet commands for embedded controller 1206 to execute to perform the firing polygon of an instructed sorting operation. When the MCS originated control signals include jet commands, latency may be introduced in sending more data from the MCS over a network to the air jet array sorting device but embedded controller 1206 may require fewer computing resources by not needing to locally generate such jet commands. In some other embodiments, the control signals received from the MCS do not already include a data structure that includes a time series of air jet commands for embedded controller 1206 to execute and instead, embedded controller 1206 processes the received input control signals (e.g., instructions from the MCS) and then references internal data structure(s) stored at air jet control data structure storage 1208 that are specific to the control of air jets of air jet array 1202, and uses the control signals and located internal data structure(s) to generate commands compatible with the target device to effectuate the desired actions. Regardless of where the jet commands corresponding to a firing polygon are generated, embedded controller 1206 is configured to use the jet commands to cause the specified subset of air jets to start activating (e.g., to start emitting positive airflow at a specified pressure and/or for a specified duration) at each point in time that is prescribed by the firing polygon over the duration prescribed by the firing polygon to effectuate a 2D airstream.

Figure 13A:
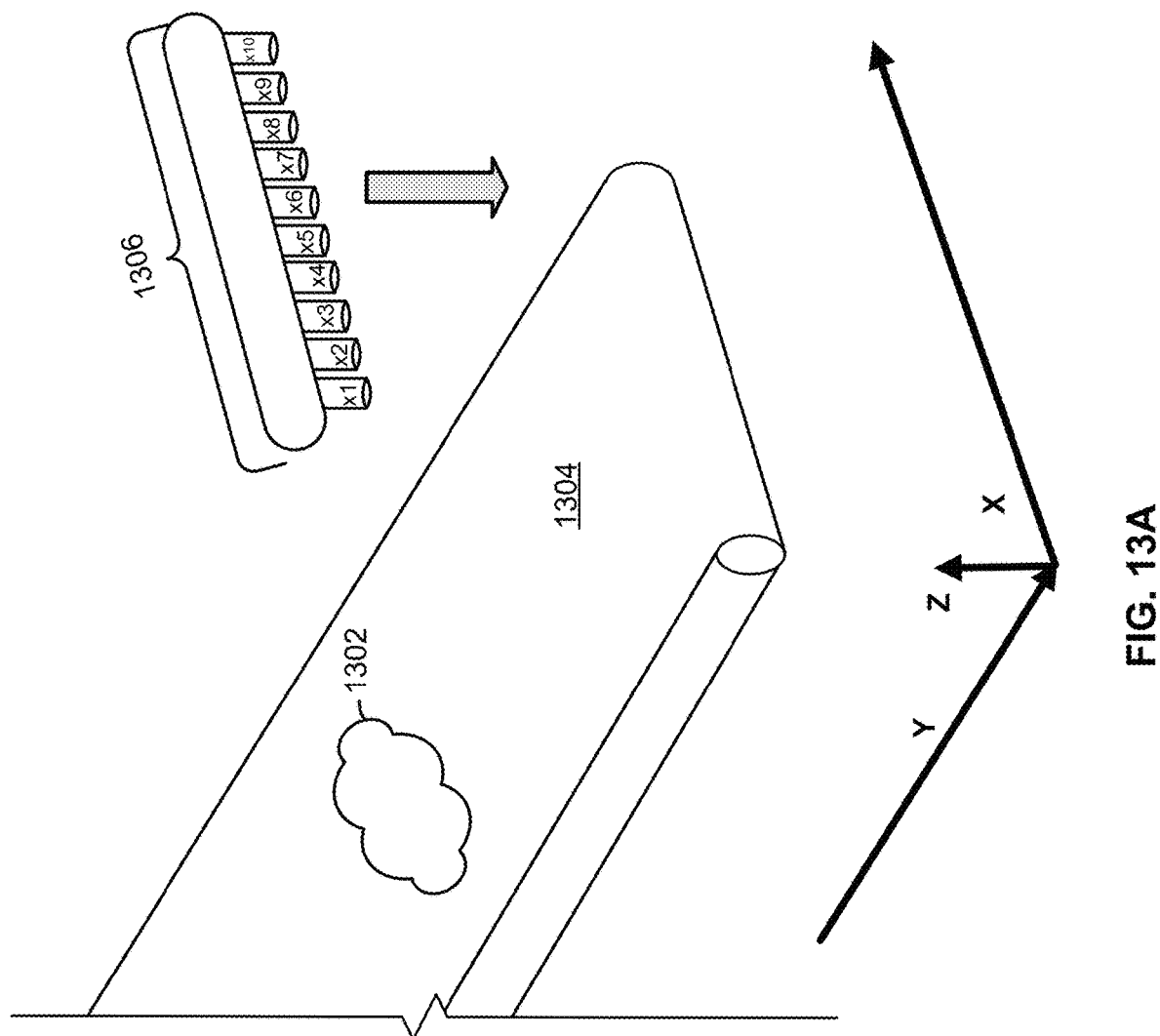
FIG. 13A is a diagram that shows a sorting system in which object 1302 is being conveyed by conveyor device 1304 towards air jet array sorting device 1306, which includes 10 air jets respectively identified by X1, X2, X3, X4, X5, X6, X7, X8, X9, and X10.
Figure 13B:
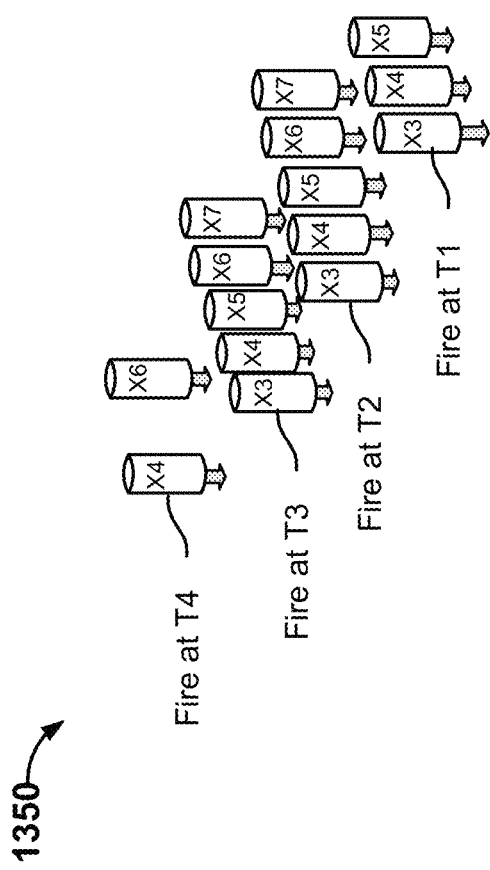
FIG. 13B is a diagram showing the firing polygon corresponding to object 1302 of FIG. 13A.

FIGS. 13A and 13B describe an example of determining a firing polygon to be used by an air jet array sorting device to perform a sorting operation on a target object. FIG. 13A is a diagram that shows a sorting system in which object 1302 is being conveyed by conveyor device 1304 towards air jet array sorting device 1306, which includes 10 air jets respectively identified by X1, X2, X3, X4, X5, X6, X7, X8, X9, and X10. The air jets of air jet array sorting device 1306 are configured to emit airflow downwards in the Z-direction (which is the "downcut" configuration). For example, an image of object 1302 had been captured and analyzed to determine that the attributes of object 1302 match target object criteria that is used by air jet array sorting device 1306 and that therefore, object 1302 is a target object relative to air jet array sorting device 1306. In another example, object 1302 may not be an individual object but a clump of (e.g., biogenic) materials (e.g., with an irregular shape and/or with non-discrete boundaries). The image of object 1302 could have been segmented and the image region/segment that matches object 1302 could have been assigned a (e.g., biogenic-related) material classification (e.g., using a process such as process 600 of FIG. 6) that matches the target object criteria. In some embodiments, a firing polygon is then determined based on the shape/dimensions/boundary of object 1302 or the image segment/region in pixel space that includes object 1302. In particular, in this example, the firing polygon is determined to include air jets along the X-direction that corresponds to the determined X coordinate of (e.g., the centroid of) object 1302 (or the image segment/region that includes object 1302) and includes the number of air jets to fire at each point in time to match the detected dimensions (e.g., along the X and Y directions) of object 1302 (or the image segment/region that includes object 1302). FIG. 13B is a diagram showing the firing polygon corresponding to object 1302 of FIG. 13A. Firing polygon 1350 prescribes a specified subset of air jets to be fired at each of four points in time starting at time T1, which is equivalent to or is close to the start time at which object 1302 is predicted to begin to pass over the controllable air stream target region of air jet array sorting device 1306. At time T1, Air Jets X3, X4, and X5 are activated to shoot air downwards along the Z-direction. The amount of pressure of the air that is emitted by each activated air jet is represented by the height of the gray arrow that is pointed out of each air jet. For example, a longer gray arrow indicates a higher pressure than a shorter gray arrow. At time T2, Air Jets X3, X4, X5, X6, and X7 are activated to shoot air downwards along the Z-direction. At time T3, Air Jets X3, X4, X5, X6, and X7 are again activated to shoot air downwards along the Z-direction. At time T4, Air Jets X4 and X6 are activated to shoot air downwards along the Z-direction. As shown by firing polygon 1350, at each point in time, a firing polygon can specify either contiguous or even non-contiguous air jets to be activated and different air jets that are activated at the same or different points in time can be activated to shoot out air with different amounts of pressure. While not shown in FIG. 13B, a firing polygon can also specify the dwell time (the firing time duration) for each air jet that is to be activated at a given point in time. In the example of FIG. 13B, the 2D shape of air that is formed over time by activating an array of air jets in accordance to firing polygon 1350 roughly corresponds to the 2D projection of object 1302 to the plane defined by the X and Y directions but there are the greatest number/width of activated air jets at times T2 and T3 to ensure that the middle section (e.g., and heaviest portion) of object 1302 that passes over the air jets is engaged with more force to lift object 1302 towards the desired destination.

Figure 14:
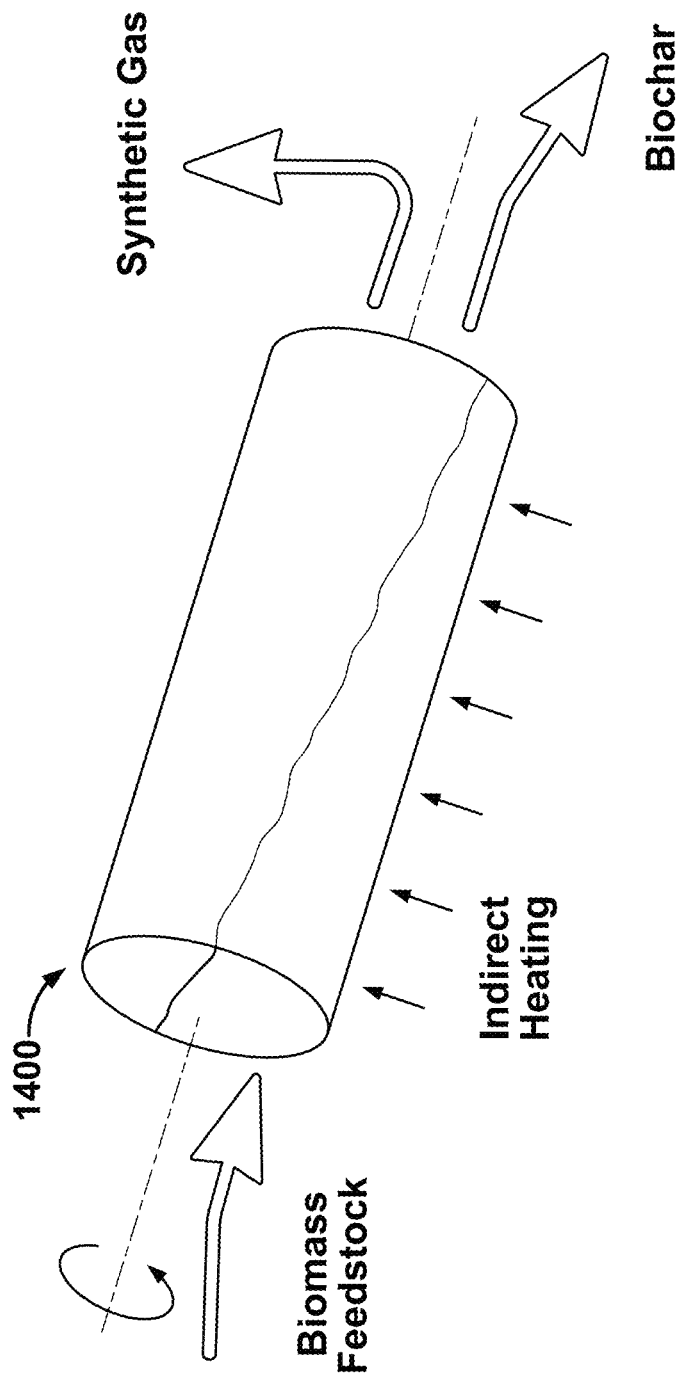
FIG. 14 is a diagram showing an example pyrolysis system in accordance with some embodiments.

FIG. 14 is a diagram showing an example pyrolysis system in accordance with some embodiments. In some embodiments, pyrolysis system 1400 comprises a rotary kiln, which is a device that applies indirect heat to and rotates the materials inside. In some embodiments, pyrolysis 120 of FIG. 1, pyrolysis 230 of FIG. 2, and/or pyrolysis 344 of FIG. 3 can be implemented, at least in part, using pyrolysis system 1400. As shown in FIG. 14, the rotary kiln is angled relative to the plane (e.g., the ground) over which the kiln is placed. The input into the pyrolysis system 1400 is Biomass Feedstock. In some embodiments, Biomass Feedstock comprises the formulated sorted mixture of biogenic materials that could have been extracted from an input stream of heterogeneous materials and/or prepared as described by process 100 of FIG. 1, process 200 of FIG. 2, and/or process 300 of FIG. 3, and/or extracted at sorting facility 400 of FIG. 4. In some embodiments, the formulation/composition of the Biomass Feedstock was determined based on a selected, desired formulation corresponding to a specified use case/application/type of the biochar and/or syngas that is to be created from pyrolyzing the biomass using a process such as process 800 of FIG. 8. Biomass Feedstock that is input into pyrolysis system 1400 is then processed by pyrolysis system 1400 in accordance with process parameters such as residence temperature (e.g., the temperature at which to heat the materials) and residence time (e.g., the duration for which the materials are to be heated). In some embodiments, the process parameters that are used by pyrolysis system 1400 to heat Biomass Feedstock may be dynamically determined/instructed/modified by the MCS based on the tracked composition of Biomass Feedstock from the sorting process. In some embodiments, the process parameters that are used by pyrolysis system 1400 to heat Biomass Feedstock are predetermined according to the specified biochar and/or syngas use case. While pyrolysis system 1400 is heating Biomass Feedstock to create solid Biochar, Synthetic Gas (syngas) is also produced. In some embodiments, Synthetic Gas can be immediately used on-site (e.g., at the facility at which pyrolysis system 1400 is located) to provide heat and power. In some embodiments, Synthetic Gas (e.g., which can leave pyrolysis system 1400 through a flue or another mechanism) can be harvested and safely stored for subsequent use in a biofuels production process. Biochar (solids) is also created by pyrolysis system 1400's heating/processing of Biomass Feedstock. In some embodiments, a sample of the produced Biochar can be analyzed to characterize the quality/composition of the biochar and that analysis may drive reconfiguration of upstream sorting at the sorting facility at which the Biomass Feedstock was created and/or reconfiguration of pyrolysis system 1400's process parameters to influence the quality/composition of subsequently created Biomass Feedstock. In some embodiments, Biochar created by pyrolysis system 1400 can be packaged and/or transported to a location associated with a desired use case (e.g., to use as landfill cover, soil amendment, and/or added into construction materials).

Figure 15:
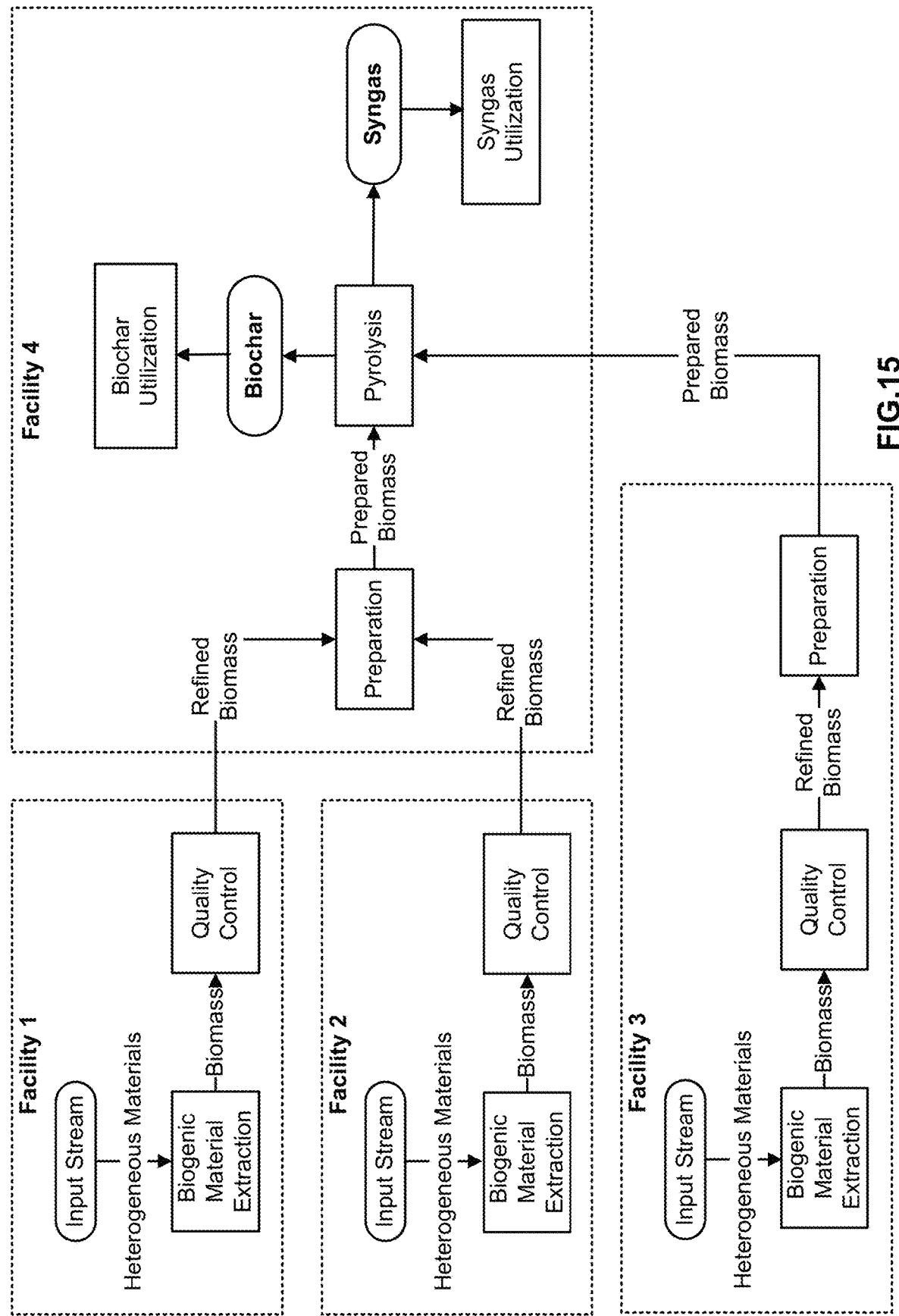
FIG. 15 is a diagram showing an example arrangement in which biogenic material extraction from input streams of heterogeneous materials and the ultimate generation of biochar and syngas from the extracted biogenic material are performed across multiple facilities.

FIG. 15 is a diagram showing an example arrangement in which biogenic material extraction from input streams of heterogeneous materials and the ultimate generation of biochar and syngas from the extracted biogenic material are performed across multiple facilities. In particular, FIG. 15 describes an example of implementing the components/sub-processes of process 100 of FIG. 1 across multiple facilities. Each of Facilities 1 and 2 are sorting facilities that ingest input streams of heterogeneous materials (e.g., MSW) and then separate the input streams into biogenic materials (biomass) and at least one other category (e.g., residue or commodities such as plastic). In some embodiments, each of Facilities 1 and 2 can be implemented using an instance of sorting facility 400 of FIG. 4. Facility 3 is also a sorting facility that ingests an input stream of heterogeneous materials (e.g., MSW) and then separates the input stream into biogenic materials (biomass) and at least one other category. In some embodiments, Facility 3 can be implemented using an instance of sorting facility 400 of FIG. 4 with the addition of equipment/components for preparing (e.g., drying and fines reduction) the refined biomass. In the example arrangement shown in FIG. 15, the refined biomass (but not yet prepared) produced by Facilities 1 and 2 can be transported (e.g., either conveyed or trucked) to Facility 4, and be prepared at Facility 4 into prepared biomass that will also be pyrolyzed at Facility 4. Furthermore, in the example arrangement shown in FIG. 15, the prepared biomass produced by Facility 3 can be transported (e.g., either conveyed or trucked) to Facility 4, at which it will be pyrolyzed. In the example of FIG. 15, Facility 4 may not locally perform biogenic material extraction and only provides preparation and pyrolysis processes on materials that have been sorted elsewhere. As such, the example arrangement as shown in FIG. 15 contemplates centralizing certain sub-processes (e.g., preparation and pyrolysis) within the overall process of separating biogenic material from heterogeneous materials and generating biochar/syngas from the sorted materials. By centralizing certain sub-processes at a single facility, fewer instances of equipment for the centralized drying/pyrolysis processes, for example, need to be purchased and maintained because multiple sorting facilities can leverage the common/centralized equipment to produce biochar and syngas. Additionally, by centralizing certain sub-processes at a single facility, existing sorting facilities that perform sorting do not need to be modified and can still participate in the supply chain for producing biochar and syngas.

In some embodiments, facilities operate in a serial or in a "hub and spoke" architecture to produce biomass end products (e.g., biochar, syngas, and/or packaged biomass) in which one or more facilities each performs the role of a "satellite" (or also sometimes referred to as a "spoke" facility) and another facility performs the role of the "centralized" (or also sometimes referred to as a "hub") facility. In some embodiments, each satellite facility is configured to perform a sort through input material streams (e.g., MSW) to extract the biogenic material and to refine the biogenic material through quality control. Then, the refined sorted biogenic material produced by each satellite facility is transported (e.g., via conveyance or trucking) to a centralized hub facility, which is configured to perform additional processing on the (e.g., aggregated) refined sorted biogenic material. The output refined and sorted biogenic material from a satellite facility becomes high-quality infeed to the centralized processes of the centralized sorting facility, which results in both an overall efficiency improvement and reduction in the cost of processing sorted biogenic materials.

Figure 16:
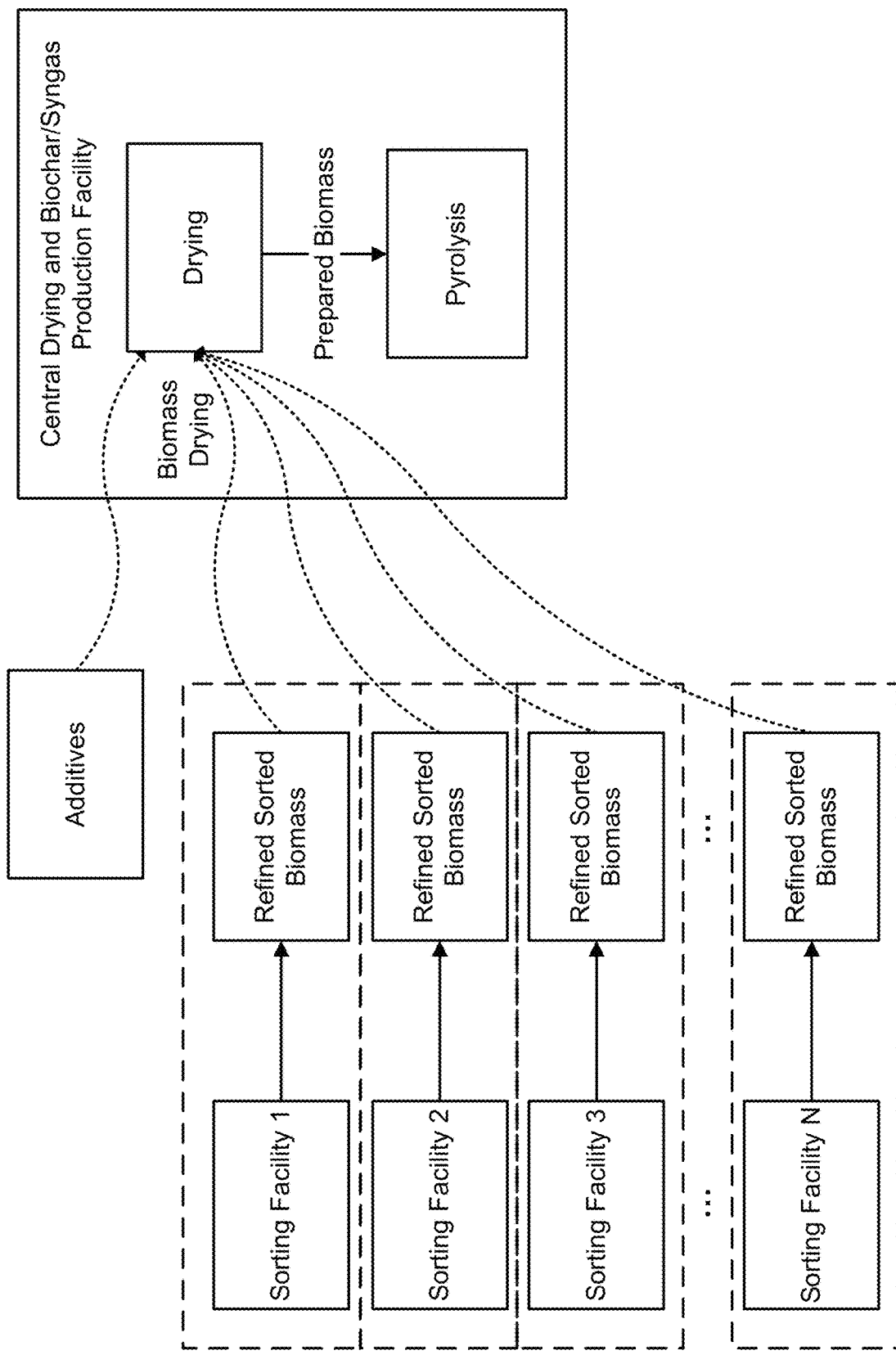
FIG. 16 shows an example configuration of a hub and spoke configuration of producing biochar and syngas in accordance with some embodiments.

FIG. 16 shows an example configuration of a hub and spoke configuration of producing biochar and syngas in accordance with some embodiments. Each of Sorting Facilities 1, 2, 3, . . . , N can be implemented, at least in part, using an instance of sorting facility 400 of FIG. 4, and is configured to receive respective input material streams and output respective streams/containers of refined sorted biogenic materials. For example, Sorting Facilities 1, 2, 3, . . . . N can be located in different geographic locations. The respective refined sorted biogenic materials that are produced at each of Facilities 1, 2, 3, . . . , N can be transported (e.g., via conveyance or trucking) to the Central Drying and Biochar/Syngas Production Facility, which is configured to process the collective refined sorted biogenic materials or each instance of refined sorted biogenic materials that is received from each of Sorting Facilities 1, 2, 3, . . . , N. Further processing of the aggregated refined sorted biogenic materials at the Central Drying and Biochar/Syngas Production Facility may include adding additives (e.g., lignocellulosic materials such as paper and cardboard) to alter the chemical composition/moisture content of the received refined sorted biogenic materials (e.g., to meet a desired formulation). The biogenic materials can then be dried to meet a set of desired moisture criteria. For example, the biogenic material can be dried using the heat of the syngas captured in a previous or concurrent pyrolysis process that is applied to a separate set of biogenic material. The dried biogenic materials may then be converted into biochar using pyrolysis and/or another biochar production technique, with syngas being a byproduct of the biochar production. The generated biochar could then be used in various applications, depending on the characterization/formulation of the biochar. The advantage of such a hub and spoke arrangement that is shown in FIG. 16 is that each individual sorting facility may focus on the generation of refined sorted biogenic materials from a heterogeneous input material stream and outsource the drying and biochar production to be performed offsite (at the Central Drying and Biochar/Syngas Production Facility). Furthermore, the Central Drying and Biochar/Syngas Production Facility can just focus on receiving refined sorted biogenic materials from individual sorting facilities, and collectively drying the material and producing biochar/syngas without needing to possess the equipment and technology associated with material separating and sorting.

Figure 17:
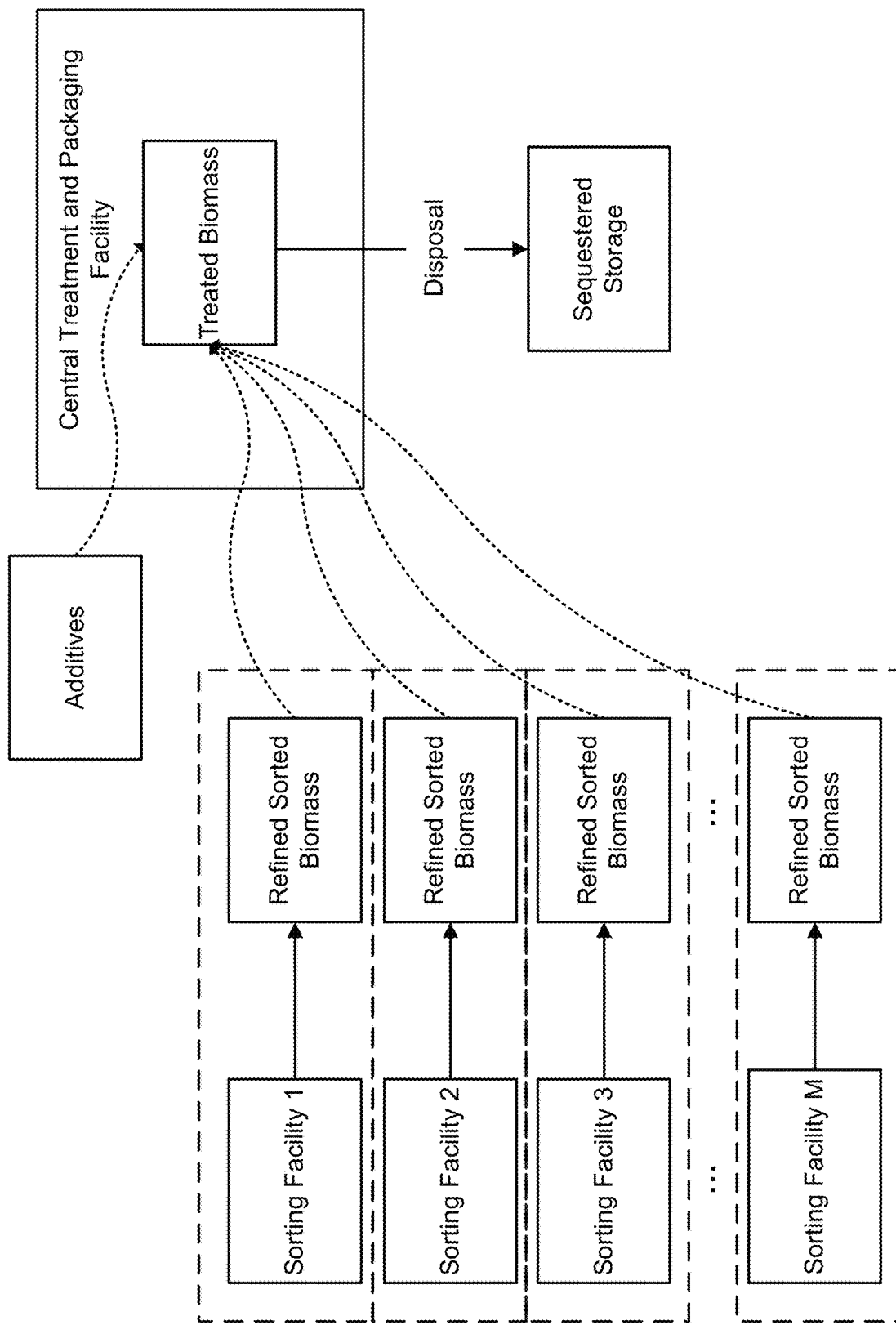
FIG. 17 shows an example configuration of a hub and spoke configuration of packaging and disposing sorted biogenic material in accordance with some embodiments.

FIG. 17 shows an example configuration of a hub and spoke configuration of packaging and disposing sorted biogenic material in accordance with some embodiments. Each of Sorting Facilities 1, 2, 3, . . . , M can be implemented, at least in part, using an instance of sorting facility 400 of FIG. 4, and is configured to receive respective input material streams and output respective streams/containers of refined sorted biogenic materials. For example, Sorting Facilities 1, 2, 3, . . . , M can be located in different geographic locations. The respective refined sorted biogenic materials that are produced at each of Facilities 1, 2, 3, . . . , M can be transported (e.g., via conveyance or trucking) to the Central Treatment and Packaging Facility, which is configured to process the collective refined sorted biogenic materials or each instance of refined sorted biogenic materials that are received from each of Sorting Facilities 1, 2, 3, . . . , M. Further processing of the aggregated refined sorted biogenic materials at the Central Treatment and Packaging Facility may include adding additives (e.g., lignocellulosic materials such as paper and cardboard) to alter the chemical composition/moisture content of the received refined sorted biogenic materials and other treatments (e.g., adding salt brine to the materials). For instance, salt or vinegar brines may be added to create environments hostile to anaerobic bacteria. In other words, it is possible to introduce these brines to "pickle" the biogenic materials.

The treated refined sorted biogenic materials ("Treated Biomass") are then sequestered in a manner with the goals of (a) preventing the escape of GHG, and/or (b) the decomposition of material into GHG. One such method to accomplish these goals is to first package the material (e.g., using a wrapping machine) for long-term storage and then to put the package in a container. The goal of such packaging may be the prevention of carbon leakage for 100 years or more. Additionally, the packaging may be performed in a manner that inhibits the decomposition of the contained material. Such packaging may also be designed to prevent gas leakage not only to prevent GHG emissions but also to create a certain chemistry in the material. For instance, a seal of the gasses may create anaerobic conditions as bacteria exhaust the supply of oxygen in the material. The anaerobic microbes may create acidic byproducts that in turn create a hostile environment for these bacteria, which prevents further anaerobic decomposition of material. The result is that GHG leakage is prevented, but also GHG creation is prevented as well through early termination of the traditional decomposition process of these materials. In some embodiments, the treated biomass is wrapped with a plastic film. This wrapping may be several layers thick and may incorporate a plastic film with high gas impermeability, particularly for GHG. Examples of such low permeability film include TIF films or EVOH films, which have particularly low permeability. This film may be applied in a number of ways. One such way is the use of a bale-wrapping system commonly used for refuse-derived-fuel or MSW storage, which can wrap square or cylindrical bales with layers of such plastic film. This film may be made sufficiently robust to handling so that it can be deposited in a landfill.

In some embodiments, the packaging and sequestering of refined sorted biogenic material may be made more efficient by removing non-desirable material, such as moisture by heating the material, or other high volume/low density content. This may be further assisted by densifying the material, such as through the use of a baler. There may be scenarios in which the material is treated through size reduction (e.g., shredding, grinding), heat application, mixing, emulsifying, etc. in order to produce the most effective material composition for carbon sequestration. Resizing/comminution helps drive homogenization before compression, which provides for maximally efficient storage techniques and the optimal blend of desirable material characteristics uniformly throughout the material, enabling maximally efficient sequestration.

There are multiple venues where the packaged material may be stored, such as a storage facility but also a landfill, or a specialized landfill built for the monitoring and protection of the biogenic material. The storage of the material may be complemented with carbon dioxide and methane sensing technology to ensure the slow or zero decomposition of material or leakage of the gases.

The advantage of such a hub and spoke arrangement that is shown in FIG. 17 is that each individual sorting facility may focus on the generation of refined sorted biogenic materials from a heterogeneous input material stream and outsource the additional treatment, packaging, and disposal to be performed offsite (at the Central Treatment and Packaging Facility). Furthermore, the Central Treatment and Packaging Facility can just focus on receiving refined sorted biogenic materials from individual sorting facilities, collectively treating the material, and then packaging/disposing the material without needing to possess the equipment and technology associated with material separating and sorting.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A sorting system, comprising:
one or more processors configured to:
   detect biogenic material within an input stream of heterogeneous material;
   determine to sort the biogenic material based at least in part on a desired biochar formulation; and
   track a composition of a sorted mixture of biogenic material; and
a sorting device configured to perform a sorting operation on the biogenic material from the input stream of heterogeneous material.

2. The sorting system of claim 1, wherein to detect the biogenic material within the input stream of heterogeneous material comprises to:
receive, from one or more image sensors, a set of images of the input stream of heterogeneous material;
identify a region within the set of images, wherein the biogenic material corresponds to the region; and
characterize the region within the set of images into a biogenic-related classification.

3. The sorting system of claim 2, wherein the one or more processors are further configured to query a chemical database to determine additional characteristics associated with the biogenic material based at least in part on the biogenic-related classification.

4. The sorting system of claim 3, wherein the additional characteristics comprise one or more of the following: proximate ultimate data, composition by item types, chemical properties, and moisture data.

5. The sorting system of claim 3, wherein the composition of the sorted mixture of biogenic material is determined based on one or more of the biogenic-related classification and the additional characteristics.

6. The sorting system of claim 1, wherein to detect the biogenic material within the input stream of heterogeneous material comprises to analyze sensor data from one or more sensors.

7. The sorting system of claim 6, wherein the one or more sensors include one or more of the following: an image sensor, a near infrared sensor, a hyperspectral sensor in the ultraviolet to the infrared ranges, a depth sensor, and a moisture sensor.

8. The sorting system of claim 1, wherein to track the composition of the sorted mixture of biogenic material comprises to obtain sensed data from a sensor located in a container holding the sorted mixture of biogenic material, wherein the sensor includes one or more of the following: an image sensor, a near infrared sensor, a depth sensor, and a moisture sensor.

9. The sorting system of claim 1, wherein to determine to sort the biogenic material comprises to:
compare attributes of the biogenic material to a set of target object criteria, wherein the set of target object criteria is determined based at least in part on the desired biochar formulation; and
determine that the attributes of the biogenic material match the set of target object criteria.

10. The sorting system of claim 1, wherein the one or more processors are further configured to:
determine a discrepancy based at least in part on a comparison of the composition to the desired biochar formulation; and
reconfigure sorting parameters associated with the sorting device based at least in part on the discrepancy to cause additional material to be added to the sorted mixture of biogenic material and an update to the composition associated with the sorted mixture of biogenic material.

11. The sorting system of claim 10, wherein the sorting parameters comprise target object criteria.

12. The sorting system of claim 1, wherein the one or more processors are further configured to:
determine a discrepancy based at least in part on a comparison of the composition to the desired biochar formulation; and
reconfigure process parameters associated with sorting facility equipment based at least in part on the discrepancy to cause additional material to cause the sorted mixture of biogenic material to correspond to the desired biochar formulation,
wherein the process parameters comprise one or more of the following: shredder speed, shredder rotating pattern, screen speed, conveyor speed, drying temperature, drying residence time, pyrolysis temperature, pyrolysis residence time, mill sizing, and pressure associated with wind density separation devices.

13. The sorting system of claim 1, wherein the sorting device comprises a first sorting device, wherein the sorting system further comprises a second sorting device, and wherein the one or more processors are further configured to:
determine a non-biogenic object on a pathway designated for biomass, wherein the sorting device had performed a previous sorting operation that removed the non-biogenic object from the input stream of heterogeneous material; and
remove the non-biogenic object from the pathway designated for biomass.

14. The sorting system of claim 1, wherein the sorting device comprises a controllable array of air jets configured to perform the sorting operation by shooting a positive airflow on the biogenic material in a downcut configuration.

15. The sorting system of claim 14, wherein the controllable array of air jets is configured to perform the sorting operation by shooting the positive airflow on the biogenic material based at least in part on a firing polygon, wherein the firing polygon is determined based at least in part on a location of the biogenic material on a conveyor device.

16. The sorting system of claim 1, wherein the one or more processors are configured to:
obtain an analysis with respect to biochar produced from pyrolysis of at least the sorted mixture of biogenic material; and
determine to reconfigure sorting parameters associated with the sorting device based at least in part on the analysis.

17. The sorting system of claim 1, wherein the one or more processors are configured to:
obtain an analysis with respect to biochar produced from pyrolysis of at least the sorted mixture of biogenic material; and
determine to reconfigure process parameters,
wherein the process parameters comprise one or more of the following: shredder speed, shredder rotating pattern, screen speed, conveyor speed, drying temperature, drying residence time, pyrolysis temperature, pyrolysis residence time, mill sizing, and pressure associated with wind density separation devices.

18. The sorting system of claim 1, wherein the desired biochar formulation corresponds to one or more of the following biochar applications: concrete intermixing, asphalt intermixing, soil amendment, landfill cover, fuel for thermal processes, and a filtration system.

19. The sorting system of claim 1, wherein the desired biochar formulation further corresponds to a desired syngas formulation, and wherein the desired syngas formulation corresponds to one or more of the following synthetic gas applications: onsite heat, onsite power, and use as a biofuel intermediate.

20. A method, comprising:
   detecting biogenic material within an input stream of heterogeneous material;
   sorting the biogenic material based at least in part on a desired biochar formulation; and
   tracking a composition of a sorted mixture of biogenic material.

\* \* \* \* \*